(12) United States Patent
Somers et al.

(10) Patent No.: US 9,399,686 B2
(45) Date of Patent: *Jul. 26, 2016

(54) AMORPHOUS PROPYLENE-ETHYLENE COPOLYMERS

(71) Applicant: Eastman Chemical Company, Kingsport, TN (US)

(72) Inventors: Marc Stacey Somers, Longview, TX (US); Bennett H Novak, Longview, TX (US); Puthenkovilakom Rajesh Raja, Kingsport, TN (US); Raymond Prescott Cottle, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,074

(22) Filed: Dec. 11, 2014

(65) Prior Publication Data

US 2015/0225622 A1 Aug. 13, 2015

Related U.S. Application Data

(60) Provisional application No. 61/937,024, filed on Feb. 7, 2014.

(51) Int. Cl.
*C08K 5/00* (2006.01)
*C08F 4/44* (2006.01)
(Continued)

(52) U.S. Cl.
CPC .............. *C08F 10/06* (2013.01); *C08F 210/06* (2013.01); *C08K 5/01* (2013.01); *C08K 5/134* (2013.01); *C08K 11/00* (2013.01); *C08L 23/10* (2013.01); *C09J 123/10* (2013.01); *C09J 123/14* (2013.01)

(58) Field of Classification Search
CPC ................ C08F 4/58; C08F 4/16; C08F 4/10; C08F 10/06; C08F 210/06; C08K 5/01; C08K 11/00; C08K 5/134; C09J 123/14
USPC .......................................... 524/291; 526/128
See application file for complete search history.

(56) References Cited

U.S. PATENT DOCUMENTS 4,367,322 A 1/1983 Shiga et al.
4,847,340 A 7/1989 Allen
(Continued)

FOREIGN PATENT DOCUMENTS

CA 1282546 C 4/1991
JP 2000063420 A 2/2000
WO WO 2013/019507 A2 2/2013

OTHER PUBLICATIONS

Notification of Transmittal of The International Search Report and the Written Opinion of the International Searching Authority, or the Declaration—International Application No. PCT/US15/11689 with a mailing date of Apr. 10, 2015.

(Continued)

*Primary Examiner* — William Cheung
(74) *Attorney, Agent, or Firm* — Polly C. Owen

(57) ABSTRACT

Amorphous propylene-ethylene copolymers are described herein that can include high amounts of ethylene and exhibit desirable softening points and needle penetrations. The desirable combinations of softening points and needle penetrations in these propylene-ethylene copolymers allow them to have a broad operating window. Due their broad operating window, the propylene-ethylene copolymers can be utilized in a wide array of applications and products, including hot melt adhesives.

20 Claims, 5 Drawing Sheets

(51) Int. Cl.
  *C08F 10/06* (2006.01)
  *C08K 5/134* (2006.01)
  *C09J 123/14* (2006.01)
  *C08F 210/06* (2006.01)
  *C08K 11/00* (2006.01)
  *C08K 5/01* (2006.01)
  *C09J 123/10* (2006.01)
  *C08L 23/10* (2006.01)

(56) References Cited

U.S. PATENT DOCUMENTS

| | | |
|---|---|---|
| 5,077,358 A | 12/1991 | Durand et al. |
| 5,100,981 A | 3/1992 | Schreck et al. |
| 5,177,162 A | 1/1993 | Matsuura et al. |
| 5,192,732 A | 3/1993 | Duranel et al. |
| 5,236,962 A | 8/1993 | Govoni et al. |
| 5,247,031 A | 9/1993 | Kioka et al. |
| 5,247,032 A | 9/1993 | Kioka et al. |
| 5,302,675 A | 4/1994 | Sustic et al. |
| 5,414,063 A | 5/1995 | Seeger et al. |
| 5,438,110 A | 8/1995 | Ishimaru et al. |
| 5,468,810 A | 11/1995 | Hayakawa et al. |
| 5,476,911 A | 12/1995 | Morini et al. |
| 5,498,770 A | 3/1996 | Hosaka et al. |
| 5,516,866 A | 5/1996 | Resconi et al. |
| 5,576,259 A | 11/1996 | Hasegawa et al. |
| 5,589,549 A | 12/1996 | Govoni et al. |
| 5,618,886 A | 4/1997 | Shinozaki et al. |
| 5,618,895 A | 4/1997 | Kerth et al. |
| 5,637,665 A | 6/1997 | Sustic et al. |
| 5,681,913 A | 10/1997 | Sustic et al. |
| 5,684,173 A | 11/1997 | Hosaka et al. |
| 5,693,729 A | 12/1997 | Fushimi et al. |
| 5,714,554 A | 2/1998 | Sustic et al. |
| 5,733,645 A | 3/1998 | Somers |
| 5,744,567 A | 4/1998 | Huffer et al. |
| 5,747,573 A | 5/1998 | Ryan |
| 5,747,595 A | 5/1998 | Saito et al. |
| 5,773,537 A | 6/1998 | Mueller et al. |
| 5,804,296 A | 9/1998 | Itoh et al. |
| 5,840,808 A | 11/1998 | Sugimura et al. |
| 5,993,964 A | 11/1999 | Nakajima |
| 6,013,742 A | 1/2000 | Huffer et al. |
| 6,034,189 A | 3/2000 | Shinozaki et al. |
| 6,057,413 A | 5/2000 | Ima et al. |
| 6,087,459 A | 7/2000 | Miro et al. |
| 6,100,351 A | 8/2000 | Sun et al. |
| 6,103,253 A | 8/2000 | Hoffmann et al. |
| 6,107,430 A | 8/2000 | Dubois et al. |
| 6,111,039 A | 8/2000 | Miro et al. |
| 6,111,046 A | 8/2000 | Resconi et al. |
| 6,121,393 A | 9/2000 | Kioka et al. |
| 6,201,090 B1 | 3/2001 | Sumitomo et al. |
| 6,214,939 B1 | 4/2001 | Shinozaki et al. |
| 6,214,949 B1 | 4/2001 | Reddy et al. |
| 6,221,984 B1 | 4/2001 | Kersting et al. |
| 6,228,956 B1 | 5/2001 | Covezzi et al. |
| 6,232,285 B1 | 5/2001 | Casteel et al. |
| 6,303,696 B1 | 10/2001 | Ushioda et al. |
| 6,306,973 B1 | 10/2001 | Takaoka et al. |
| 6,313,225 B2 | 11/2001 | Saito et al. |
| 6,313,227 B1 | 11/2001 | Tanaka et al. |
| 6,319,979 B1 | 11/2001 | Dubois et al. |
| 6,329,468 B1 | 12/2001 | Wang |
| 6,335,410 B1 | 1/2002 | Finlayson et al. |
| 6,362,298 B2 | 3/2002 | Dolle et al. |
| 6,410,663 B2 | 6/2002 | Shamshoum et al. |
| 6,423,782 B1 | 7/2002 | Yukimasa et al. |
| 6,451,726 B1 | 9/2002 | Zambon et al. |
| 6,455,643 B1 | 9/2002 | Harlin et al. |
| 6,469,112 B2 | 10/2002 | Cheng et al. |
| 6,534,606 B2 | 3/2003 | Kohler et al. |
| 6,545,099 B2 | 4/2003 | Shinozaki et al. |
| 6,566,294 B2 | 5/2003 | Miro |
| 6,569,827 B2 | 5/2003 | Van Dijk et al. |
| 6,573,350 B1 | 6/2003 | Markel et al. |
| 6,582,762 B2 | 6/2003 | Faissat et al. |
| 6,586,536 B1 | 7/2003 | Kelley |
| 6,586,543 B1 | 7/2003 | Wey et al. |
| 6,600,034 B2 | 7/2003 | Sato et al. |
| 6,630,559 B2 | 10/2003 | Shinozaki et al. |
| 6,649,725 B2 | 11/2003 | Seta et al. |
| 6,689,846 B1 | 2/2004 | Leskinen et al. |
| 6,693,161 B2 | 2/2004 | Collina et al. |
| 6,723,810 B2 | 4/2004 | Finlayson et al. |
| 6,730,754 B2 | 5/2004 | Resconi et al. |
| 6,747,103 B1 | 6/2004 | Vestberg et al. |
| 6,747,114 B2 | 6/2004 | Karandinos et al. |
| 6,870,022 B2 | 3/2005 | Iwasaki et al. |
| 6,887,817 B2 | 5/2005 | Lu et al. |
| 6,900,281 B2 | 5/2005 | Streeky et al. |
| 6,916,883 B2 | 7/2005 | Parikh et al. |
| 6,927,258 B2 | 8/2005 | Datta et al. |
| 6,960,635 B2 | 11/2005 | Stevens et al. |
| 6,982,310 B2 | 1/2006 | Datta et al. |
| 6,984,631 B2 | 1/2006 | Aranishi et al. |
| 6,984,696 B2 | 1/2006 | Curry et al. |
| 6,984,730 B2 | 1/2006 | Yamada et al. |
| 6,992,158 B2 | 1/2006 | Datta et al. |
| 6,992,159 B2 | 1/2006 | Datta et al. |
| 6,992,160 B2 | 1/2006 | Datta et al. |
| 6,998,457 B2 | 2/2006 | Kelley |
| 7,001,965 B2 | 2/2006 | Appleyard et al. |
| 7,015,170 B2 | 3/2006 | Morini et al. |
| 7,019,081 B2 | 3/2006 | Datta et al. |
| 7,019,097 B2 | 3/2006 | Sacchetti et al. |
| 7,053,164 B2 | 5/2006 | Datta et al. |
| 7,056,982 B2 | 6/2006 | Datta et al. |
| 7,071,137 B2 | 7/2006 | Klendworth et al. |
| 7,074,871 B2 | 7/2006 | Cecchin et al. |
| 7,084,218 B2 | 8/2006 | Datta et al. |
| 7,105,609 B2 | 9/2006 | Datta et al. |
| 7,157,522 B2 | 1/2007 | Datta et al. |
| 7,199,180 B1 | 4/2007 | Simmons et al. |
| 7,238,758 B2 | 7/2007 | Yoshikiyo et al. |
| 7,244,787 B2 | 7/2007 | Curry et al. |
| 7,253,221 B2 | 8/2007 | Mohanty et al. |
| 7,289,091 B2 | 10/2007 | Heo |
| 7,294,681 B2 | 11/2007 | Jiang et al. |
| 7,323,525 B2 | 1/2008 | Alastalo et al. |
| 7,329,626 B2 | 2/2008 | Spaether et al. |
| 7,332,556 B2 | 2/2008 | Cecchin et al. |
| 7,348,381 B2 | 3/2008 | Bodiford et al. |
| 7,365,136 B2 | 4/2008 | Huovinen et al. |
| 7,413,811 B2 | 8/2008 | Dharmarajan et al. |
| 7,452,953 B2 | 11/2008 | Jaaskelainen et al. |
| 7,465,775 B2 | 12/2008 | Vestberg et al. |
| 7,470,756 B2 | 12/2008 | Jaaskelainen et al. |
| 7,491,670 B2 | 2/2009 | Chen et al. |
| 7,521,518 B2 | 4/2009 | Jacobsen et al. |
| 7,524,910 B2 | 4/2009 | Jiang et al. |
| 7,524,911 B2 | 4/2009 | Karjala et al. |
| 7,538,173 B2 | 5/2009 | Schwab et al. |
| 7,579,422 B2 | 8/2009 | Jaaskelainen et al. |
| 7,589,145 B2 | 9/2009 | Brant et al. |
| 7,592,286 B2 | 9/2009 | Morini et al. |
| 7,608,668 B2 | 10/2009 | Li Pi Shan et al. |
| 7,611,776 B2 | 11/2009 | Yu et al. |
| 7,678,867 B2 | 3/2010 | Baita et al. |
| 7,807,768 B2 | 10/2010 | Becker et al. |
| 7,977,435 B2 | 7/2011 | Lin et al. |
| 7,981,982 B2 | 7/2011 | Cagnani et al. |
| 8,008,412 B2 | 8/2011 | Brant et al. |
| 8,026,311 B2 | 9/2011 | Migone et al. |
| 8,063,160 B2 | 11/2011 | Cavalieri et al. |
| 8,071,499 B2 | 12/2011 | Morini et al. |
| 8,076,422 B2 | 12/2011 | Heemann et al. |
| 8,106,138 B2 | 1/2012 | Sheard et al. |
| 8,129,490 B2 | 3/2012 | Cagnani et al. |
| 8,178,633 B2 | 5/2012 | Cai et al. |
| 8,188,164 B2 | 5/2012 | Chen et al. |
| 8,207,271 B2 | 6/2012 | Denifl et al. |
| 8,207,272 B2 | 6/2012 | Bernreitner et al. |

(56) References Cited

U.S. PATENT DOCUMENTS

| | | | |
|---|---|---|---|
| 8,222,336 | B2 | 7/2012 | Eberhardt et al. |
| 8,227,370 | B2 | 7/2012 | Chang |
| 8,273,838 | B2 | 9/2012 | Chan et al. |
| 8,288,304 | B2 | 10/2012 | Chen et al. |
| 8,288,481 | B2 | 10/2012 | Fiebig et al. |
| 8,309,501 | B2 | 11/2012 | Kolb et al. |
| 8,324,335 | B2 | 12/2012 | Ito et al. |
| 8,334,354 | B2 | 12/2012 | Kwon et al. |
| 8,372,193 | B2 | 2/2013 | Chen et al. |
| 8,378,048 | B2 | 2/2013 | Kolb et al. |
| 8,383,731 | B2 | 2/2013 | Lewtas et al. |
| 8,420,742 | B2 | 4/2013 | Karjala et al. |
| 8,431,642 | B2 | 4/2013 | Tancrede et al. |
| 8,487,026 | B2 | 7/2013 | Bach et al. |
| 8,536,268 | B2 | 9/2013 | Karjala et al. |
| 8,552,105 | B2 | 10/2013 | Peters |
| 2004/0127614 | A1 | 7/2004 | Jiang et al. |
| 2004/0132935 | A1 | 7/2004 | Arjunan et al. |
| 2008/0021186 | A1 | 1/2008 | Steib |
| 2008/0114142 | A1 | 5/2008 | Hicks et al. |
| 2009/0062466 | A1 | 3/2009 | Dong et al. |
| 2009/0105407 | A1 * | 4/2009 | Karjala ............ C08F 10/00 524/547 |
| 2009/0182103 | A1 | 7/2009 | Chang et al. |
| 2009/0270560 | A1 | 10/2009 | Bacci et al. |
| 2010/0047064 | A1 | 2/2010 | Mokulys et al. |
| 2010/0210795 | A1 | 8/2010 | Clarembeau et al. |
| 2010/0249330 | A1 | 9/2010 | Massari et al. |
| 2011/0034634 | A1 | 2/2011 | Grein et al. |
| 2011/0086970 | A1 | 4/2011 | Grein et al. |
| 2011/0224387 | A1 | 9/2011 | Bergstra et al. |
| 2012/0088086 | A1 | 4/2012 | Grein et al. |
| 2012/0116029 | A1 | 5/2012 | Van Egmond et al. |
| 2012/0232221 | A1 | 9/2012 | Collina et al. |
| 2013/0197153 | A1 | 8/2013 | Kheirandish et al. |
| 2013/0253124 | A1 | 9/2013 | Bernreiter et al. |
| 2013/0267660 | A1 | 10/2013 | Leskinen et al. |
| 2013/0267667 | A1 | 10/2013 | Paavilainen et al. |
| 2015/0225490 | A1 | 8/2015 | Somers et al. |
| 2015/0225619 | A1 | 8/2015 | Somers et al. |
| 2015/0225620 | A1 | 8/2015 | Somers et al. |
| 2015/0225621 | A1 | 8/2015 | Somers et al. |

OTHER PUBLICATIONS

ASTM D5; "Standard Test Method for Penetration of Bituminous Materials" Published Feb. 2013.

ASTM D412; "Standard Test Methods for Vulcanized Rubber and Thermoplastic Elastomers—Tension", Published Apr. 2013.

ASTM E794; "Standard Test Method for Melting and Crystallization Temperatures by Thermal Analysis"; Published Sep. 2012.

ASTM D903; "Standard Test Method for Peel or Stripping Strength of Adhesive Bonds"; Published Oct. 2010.

ASTM D1544; Standard Test Method for Color of Transparent Liquids (Gardner Color Scale); Published Jun. 2010.

ASTM D2240; Standard Test Method for Rubber Property—Durometer Hardness; Published Apr. 2010.

ASTM D3236; Standard Test Method for Apparent Viscosity of Hot Melt Adhesives and Coating Materials; Published Jul. 2014.

ASTM D3654; "Standard Test Methods for Shear Adhesion of Pressure-Sensitive Tapes"; Published Nov. 2011.

ASTM D4497; Standard Test Method for Determining the Open Time of Hot Melt Adhesives (Manual Method); Published Oct. 2010.

ASTM D6195; Standard Test Methods for Loop Tack; Published Apr. 2011.

ASTM E28 Standard Test Methods for Softening Point of Resins Derived from Pine Chemicals and Hydrocarbons, by Ring-and-Ball Appratus; Published Aug. 2014.

ASTM E111; Standard Test Method for Young's Modulus, Tangent Modulus, and Chord Modulus; Published Jan. 2011.

ASTM D4498; "Standard Test Method for Heat-Fail Temperature in Shear of Hot Melt Adhesives"; Published Jun. 2007.

Co-pending U.S. Appl. No. 14/567,028, filed Dec. 11, 2014.

Co-pending U.S. Appl. No. 14/567,037, filed Dec. 11, 2014.

Co-pending U.S. Appl. No. 14/567,050, filed Dec. 11, 2014.

Co-pending U.S. Appl. No. 14/567,093, filed Dec. 11, 2014.

USPTO Office Action dated Feb. 5, 2016 for copending U.S. Appl. No. 14/567,093.

USPTO Notice of Allowance dated Feb. 16, 2016 for copending U.S. Appl. No. 14/567,028.

USPTO Notice of Allowance dated Feb. 16, 2016 for copending U.S. Appl. No. 14/567,037.

USPTO Notice of Allowance dated Feb. 17, 2016 for copending U.S. Appl. No. 14/567,050.

Fernanda, M.B., et al.; "Properties of Ethylene-Propylene Copolymers Synthesized by a Supported Ziegler-Natta Catalyst Based on TiCl4/MgCl2/PC13" Eur. Polym. J., vol. 33, No. 6, pp. 897-901, 1997.

Lou et al. "Polypropylene Chain Structure Regulation by Alkoxysilane and Ether Type External Donors in TiCl4/DIBP/MgCl$_2$-AlEt$_3$Ziegler-Natta Catalyst" *Iranian Polymer Journal* 19 (12), 2010, pp. 927-936.

Zohuri, G. H., et al.; "Copolymerization of Ethylene—Propylene Using High-Activity Bi-supported Ziegler—Natta TiCl4 Catalyst"; *Journal of Applied Polymer Science*, vol. 93, 2004, pp. 2597-2605.

* cited by examiner

AMORPHOUS PROPYLENE-ETHYLENE COPOLYMERS

BACKGROUND

1. Field of the Invention

The present invention is generally related to amorphous propylene-ethylene copolymers and processes for producing such copolymers. More particularly, the present invention is generally related to amorphous propylene-ethylene copolymers having desirable needle penetrations, softening points, viscosities, and viscoelastic characteristics.

2. Description of the Related Art

Amorphous polyolefins are commonly used in industry to produce a wide array of products including, for example, adhesives. Common polyolefins utilized in adhesives generally include copolymers produced from propylene, ethylene, and various $C_4$-$C_{10}$ alpha-olefin monomers, such as, for example, 1-butene, 1-pentene, 1-hexene, 1-heptene, 1-octene, 1-nonene, and 1-decene. In particular, propylene-butene copolymers are commonly used to produce hot melt adhesives due to the higher adhesive bond strengths derived from these copolymers. Much of the adhesive bond strength derived from these copolymers can be attributed to the $C_4$-$C_{10}$ alpha-olefins contained therein, which can greatly increase the subsequent bonding properties of the copolymer. Unfortunately, $C_4$-$C_{10}$ alpha-olefins can be quite expensive due to market availability and can also exhibit limited reactivity during the polymerization processes.

Due to the above deficiencies of the $C_4$-$C_{10}$ alpha-olefins, some manufacturers have attempted to replace $C_4$-$C_{10}$ alpha-olefins with ethylene. Unlike many of the $C_4$-$C_{10}$ alpha-olefins, ethylene can be more readily available and more reactive than many of the commonly used $C_4$-$C_{10}$ alpha-olefins, such as 1-butene. Unfortunately, propylene-ethylene copolymers can exhibit deficiencies in hardness, thereby resulting in adhesives that lack ideal bond strength over time. Some manufacturers have attempted to increase the hardness of these copolymers by incorporating crystalline polypropylene therein. However, by adding crystalline polypropylene to these copolymers, the softening points of the copolymers are also increased. This can limit the application of these copolymers to certain types of adhesives due to the higher softening points.

Thus, there is a need for amorphous copolymers that exhibit an ideal balance between hardness and softening point and that can also be used to produce adhesives with improved adhesive characteristics.

SUMMARY

One or more embodiments of the present invention concern a copolymer comprising propylene and ethylene, which has a softening point in the range of 90 to 140° C. Furthermore, the copolymer has a needle penetration that is equal to y, which is defined by the following formula:

$$y \leq -0.000000262249x6+0.000172031278x5-0.046669720165x4+6.701746779438x3-537.286013331959x2+22,802.983472587x-400,204.018086126$$

In the above formula, x is the softening point of the copolymer.

Additionally, one or more embodiments of the present invention concern a copolymer comprising propylene and ethylene. The copolymer has a softening point in the range of 110 to 135° C. and a needle penetration of less than 25 dmm.

Furthermore, one or more embodiments of the present invention concern a copolymer comprising propylene and ethylene. The copolymer has a softening point in the range of 90 to 121° C. and a needle penetration of less than 35 dmm.

Also, one or more embodiments of the present invention concern a copolymer comprising propylene and ethylene. The copolymer has a softening point in the range of 90 to less than 115° C. and a needle penetration equal to or less than 53 dmm.

Moreover, one or more embodiments of the present invention concern a hot melt adhesive. The hot melt adhesive comprises a copolymer comprising propylene and ethylene. The copolymer has a softening point in the range of 90 to 140° C. and a needle penetration that is equal to y, which is defined by the following formula:

$$y \leq -0.000000262249x6+0.000172031278x5-0.046669720165x4+6.701746779438x3-537.286013331959x2+22,802.983472587x-400,204.018086126$$

In the above formula, x is the softening point of the copolymer.

In addition, one or more embodiments of the present invention concern a process for producing a copolymer. The process comprises reacting propylene and ethylene in the presence of a catalyst system comprising an electron donor to form the copolymer. The copolymer has a softening point in the range of 90 to 140° C. and a needle penetration that is equal to y, which is defined by the following formula:

$$y \leq -0.000000262249x6+0.000172031278x5-0.046669720165x4+6.701746779438x3-537.286013331959x2+22,802.983472587x-400,204.018086126$$

In the above formula, x is the softening point of the copolymer.

In yet further embodiments of the present invention, a process for producing a copolymer is provided. The process comprises reacting propylene and ethylene in the presence of a catalyst system comprising an electron donor to form the copolymer. The copolymer has a softening point in the range of 110 to 140° C. and a needle penetration that is equal to y, which is defined by the following formula:

$$y \leq -0.000751414552642x^4+0.374053308337937x^3-69.5967657676062x^2+5,734.02599677759x-176,398.494888882$$

In the above formula, x is the softening point of the copolymer.

BRIEF DESCRIPTION OF THE FIGURES

Embodiments of the present invention are described herein with reference to the following drawing figures, wherein.

DETAILED DESCRIPTION

Figure 1A:
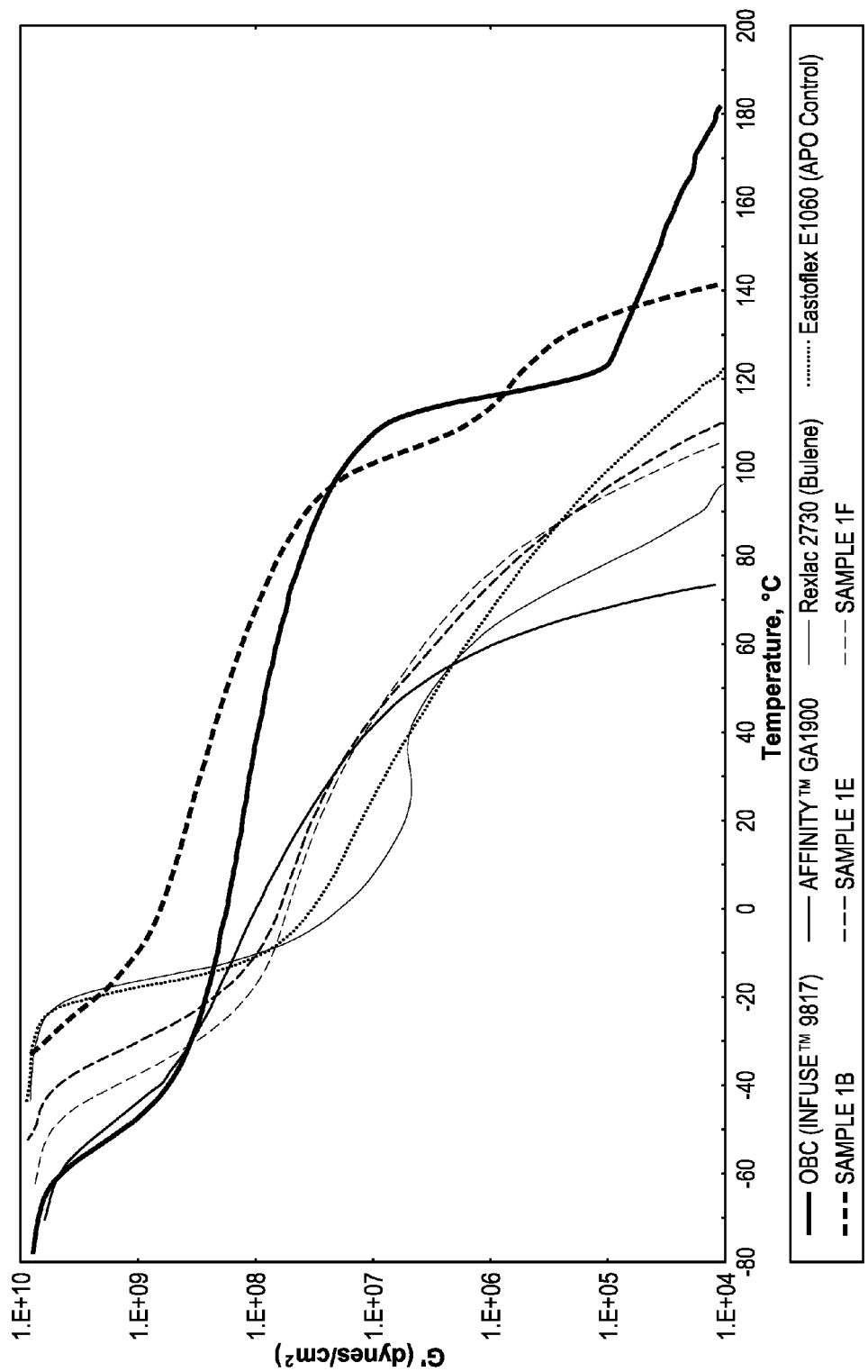
FIG. 1A depicts the viscoelastic characteristics of particular propylene-ethylene copolymers produced in Example 1.

The present invention is generally related to amorphous propylene-ethylene copolymers and their various applications. Many of the existing propylene-ethylene copolymers in the market today generally exhibit deficiencies regarding their softening points or hardness. The inventive copolymers described herein exhibit improved properties currently not available in these commercial copolymers. In particular, as described below in further detail, the inventive copolymers can exhibit desirable softening points and needle penetrations, thereby resulting in copolymers that are useful in a wide array of applications.

The Propylene-Ethylene Copolymers

Commercially-available propylene-ethylene copolymers have generally not been strong enough to be used in adhesives for packaging applications or hygiene products (e.g., diapers and feminine care products). Generally, this has to do with the lack of balance between the strength and adhesion properties of the copolymers. Historically, in order to produce a copolymer with sufficient strength, one had to limit the ethylene content of the copolymer. It has been observed that there is a correlation between the ethylene contents of a copolymer and its softening point and needle penetration, which is an indication of the copolymer's strength. Usually, the ethylene content can have a negative correlation with the softening point of the copolymer and a positive correlation with the needle penetration of the copolymer. In other words, the more ethylene that is present in a copolymer, the lower the softening point and higher the needle penetration of the copolymer. Thus, increasing the ethylene content in a propylene-ethylene copolymer may decrease the copolymer's softening point, but can also compromise its strength as shown by an increased needle penetration.

Unlike conventional propylene-ethylene copolymers available today, the inventive copolymers can exhibit a desirable softening point and needle penetration with relatively high ethylene contents. As previously noted, it can be desirable to utilize ethylene as a comonomer in propylene copolymers due to the high availability and low costs of ethylene compared to other alpha-olefins. Furthermore, there can be polymerization advantages in using ethylene as a comonomer since ethylene can be much more reactive than many other alpha-olefins.

According to various embodiments, the propylene-ethylene copolymers described herein can comprise varying amounts of ethylene. For example, the propylene-ethylene copolymers can comprise at least 1, 3, 5, 7, 10, 12, 14, 15, 17, 18, or 20 and/or not more than 70, 65, 60, 55, 50, 45, 40, 35, 30, 27, or 25 weight percent of ethylene. Moreover, the propylene-ethylene copolymers can comprise in the range of 1 to 70, 3 to 65, 5 to 60, 7 to 55, 10 to 50, 12 to 45, 14 to 40, 15 to 35, 17 to 30, 18 to 27, or 20 to 25 weight percent of ethylene.

Furthermore, in various embodiments, the propylene-ethylene copolymers can contain varying amounts of propylene. For example, the propylene-ethylene copolymers can comprise at least 40, 50, 60, 65, or 70 and/or not more than 99, 95, 90, 85, or 80 weight percent of propylene. Moreover, the propylene-ethylene copolymers can comprise in the range of 40 to 99, 50 to 95, 60 to 90, 65 to 85, or 70 to 80 weight percent of propylene.

In various embodiments, the copolymers can comprise at least 50, 65, 75, or 85 and/or not more than 99, 97.5, 95, or 90 weight percent of ethylene and propylene in combination. Moreover, the copolymers can comprise in the range of 50 to 99, 65 to 97.5, 75 to 95, or 85 to 90 weight percent ethylene and propylene in combination. Additionally or alternatively, the copolymers can comprise a weight ratio of propylene to ethylene of at least 0.5:1, 1:1, 2:1, or 2.5:1 and/or not more than 20:1, 15:1, 10:1, or 5:1. Moreover, the copolymers can comprise a weight ratio of propylene to ethylene in the range of 0.5:1 to 20:1, 1:1 to 15:1, 2:1 to 10:1, or 2.5:1 to 5:1.

In various embodiments, the copolymers can contain one or more $C_4$-$C_{10}$ alpha-olefins. As previously noted, $C_4$-$C_{10}$ alpha-olefins can be used to increase the resulting bond strength of the copolymers when utilized in adhesives. These $C_4$-$C_{10}$ alpha-olefins can include, for example, 1-butene, 1-pentene, 1-hexene, 1-heptene, 1-octene, 1-nonene, 1-decene, and combinations thereof. According to one or more embodiments, the copolymers can comprise at least 0.5, 1, 2, 3, 4, or 5 and/or not more than 40, 30, 25, 20, 15, or 10 weight percent of at least one $C_4$-$C_{10}$ alpha-olefin. Moreover, the copolymers can comprise in the range of 0.5 to 40, 1 to 30, 2 to 25, 3 to 20, 4 to 15, or 5 to 10 weight percent of at least one $C_4$-$C_{10}$ alpha-olefin.

As noted above, a lower softening point for the copolymers can be desirable so that the copolymers can be utilized and processed at lower application temperatures. In various embodiments, the copolymers can have a softening point of at least 85, 90, 95, 96, 97, 98, 99, 100, 101, 102, 103, 104, 105, 106, 107, 108, 109, 110, 113, 115, 116, 119, 120, 121, 124, 125, or 127° C. Additionally or alternatively, the copolymers can have a softening point of not more than 145, 140, 138, 137, 136, 135, 134, 132, 130, 129, 128, 127, 126, 125, 124, 123, 122, 121, 120, 118, 117, 115, 110, or 109.9° C. as measured according to ASTM E28 Standard Test Method for Softening Point of Resins Derived from Pine Chemicals and Hydrocarbons, by Ring- and Ball Apparatus using a heating rate of 5° C. per minute and a bath liquid of USP Glycerin.

Moreover, the copolymers can have a softening point in the range of 85 to 145° C., 90 to 140° C., 90 to 110° C., 90 to 121° C., 90 to 115° C., 95 to 138° C., 95 to 110° C., 96 to 136° C., 97 to 135° C., 98 to 134° C., 99 to 132° C., 100 to 130° C., 101 to 129° C., 102 to 128° C., 103 to 127° C., 104 to 126° C., 105 to 125° C., 106 to 124° C., 107 to 123° C., 108 to 122° C., 109 to 121° C., or 110 to 120° C. as measured according to ASTM E28 as discussed previously.

Despite exhibiting the low softening points described above, the copolymers can also exhibit desirable needle penetration values. Generally, the lower the needle penetration value, the higher the strength characteristics and modulus of the copolymer; however, if the needle penetration gets too low, then adhesive properties can be adversely impacted. In various embodiment, when the softening point is in the range of 90 to 140° C., the needle penetration values of the copolymers described herein can be defined by the following formula:

$$y \leq -0.000000262249x^6 + 0.000172031278x^5 - 0.046669720165x^4 + 6.701746779438x^3 - 537.286013331959x^2 + 22,802.983472587x - 400, 204.018086126.$$

Needle penetration is measured following ASTM D5 Standard Test Method for Penetration of Bituminous Materials and utilizing the following specifications:

The weight of the spindle is 47.5+/−0.05 g. The weight of the ferrule needle assembly is 2.50+/−0.05 g. The total weight of the needle and spindle assembly is 50.0+/−0.05 g. A weight of 50+/−0.05 g shall also be provided for total load of 100 g.

Samples are conditioned in a water bath at temperature of 25+/−0.1° C. [77+/−0.2° F.]

The time the needle penetrates into the sample is 5+/−0.1 s.

In various other embodiments, when the softening point is in the range of 110 to 140° C., the needle penetration values of the copolymers described herein can be defined by the following formula:

$$y \leq -0.000751414552642x^4 + 0.374053308337937x^3 - 69.5967657676062x^2 + 5{,}734.02599677759x - 176{,}398.494888882.$$

In the above formula, "y" defines the needle penetration (dmm) of the copolymer and "x" is the softening point (° C.) of the copolymer.

In various embodiments, the copolymers can have a needle penetration of at least 1, 2, 3, 4, 5, 6, 7, 8, 9, 10, 11, 12, 13, 15, 20, 30, or 35 decimillimeters ("dmm") as measured according to ASTM D5 as discussed previously. Additionally or alternatively, the copolymers can have a needle penetration of not more than 75, 73.8, 70, 60, 50, 45, 40, 30, 29, 28, 27, 26, 25, 24, 23, 22, 21, 20, or 15 dmm as measured according to ASTM D5 as discussed previously. Moreover, the copolymers can have a needle penetration in the range of 1 to 75, 2 to 50, 3 to 30, 4 to 29, 5 to 28, 6 to 27, 7 to 26, 8 to 25, 9 to 24, 10 to 23, 11 to 22, 12 to 21, or 13 to 20 dmm as measured according to ASTM D5 as discussed previously.

Depending on their intended end use, the copolymers can have varying softening points and needle penetration ranges. In various embodiments, the copolymers can have a softening point in the range of 90 to 121° C. and needle penetration less than 35 dmm. In other embodiments, the copolymers can have a softening point in the range of 90 to 115° C. and a needle penetration of less than 53 dmm. In various embodiments, the copolymers can have a softening point in the range of 110 to 138° C. and needle penetration in the range of 1 to 15 dmm. Furthermore, in certain embodiments, the copolymers can have a softening point in the range of 110 to 135° C. and needle penetration in the range of 5 to 15 dmm. Moreover, in certain embodiments, the copolymers can have a softening point in the range of 110 to 130° C. and needle penetration in the range of 10 to 15 dmm.

In various embodiments, the copolymers can have a softening point in the range of 110 to 137° C. and needle penetration in the range of 1 to 22 dmm. Furthermore, in certain embodiments, the copolymers can have a softening point in the range of 110 to 135° C. and needle penetration in the range of 5 to 22 dmm. In other embodiments, the copolymers can have a softening point in the range of 110 to 135° C. and needle penetration in the range of 10 to 24 dmm. Moreover, in certain embodiments, the copolymers can have a softening point in the range of 110 to 130° C. and needle penetration in the range of 10 to 20 dmm.

In various embodiments, the copolymers can have a softening point in the range of 110 to 134° C. and needle penetration in the range of 1 to 25 dmm. Furthermore, in certain embodiments, the copolymers can have a softening point in the range of 110 to 132° C. and needle penetration in the range of 5 to 25 dmm. Moreover, in certain embodiments, the copolymers can have a softening point in the range of 110 to 130° C. and needle penetration in the range of 10 to 25 dmm.

In various embodiments, the copolymers can have a softening point in the range of 110 to 124° C. and needle penetration in the range of 1 to 30 dmm. Furthermore, in certain embodiments, the copolymers can have a softening point in the range of 110 to 122° C. and needle penetration in the range of 5 to 30 dmm. Moreover, in certain embodiments, the copolymers can have a softening point in the range of 110 to 120° C. and needle penetration in the range of 10 to 30 dmm.

In various embodiments, the copolymers can have a softening point in the range of 110 to 120° C. and needle penetration in the range of 30 to 50 dmm. Furthermore, in certain embodiments, the copolymers can have a softening point in the range of 110 to 120° C. and needle penetration in the range of 35 to 50 dmm. Moreover, in certain embodiments, the copolymers can have a softening point in the range of 110 to 120° C. and needle penetration in the range of 30 to 45 dmm.

In various embodiments, the copolymers can have a softening point in the range of 90 to 125° C. and needle penetration of less than 30 dmm. Furthermore, in certain embodiments, the copolymers can have a softening point in the range of 90 to 123° C. and needle penetration of less than 35 dmm. Moreover, in certain embodiments, the copolymers can have a softening point in the range of 90 to 125° C. and needle penetration in the range of 10 to 30 dmm. In various embodiments, the copolymers can have a softening point in the range of 90 to 109.9° C. and needle penetration of less than 73.8 dmm. Furthermore, in certain embodiments, the copolymers can have a softening point in the range of 127 to 140° C. and needle penetration of less than 25 dmm. Moreover, in certain embodiments, the copolymers can have a softening point in the range of 124 to 126° C. and needle penetration of less than 30 dmm.

In various embodiments, the copolymers can have a softening point in the range of 121 to 123° C. and needle penetration of less than 40 dmm. Furthermore, in certain embodiments, the copolymers can have a softening point in the range of 119 to 120° C. and needle penetration of less than 50 dmm. Moreover, in certain embodiments, the copolymers can have a softening point in the range of 116 to 118° C. and needle penetration of less than 60 dmm. In other embodiments, the copolymers can have a softening point in the range of 113 to 117° C. and needle penetration of less than 70 dmm.

Generally, lower softening points in the copolymers can sometimes be accompanied by lower glass transition ("Tg") temperatures. In various embodiments, the copolymers can have a glass transition temperature of at least −100, −80, −60, or −40 and/or not more than about 20, 0, −10, or −20° C. as measured according to DMA. Moreover, the copolymers can have a Tg in the range of −100 to 20° C., −80 to 0° C., −60 to −10° C., or −40 to −20° C. as measured according to DMA.

Furthermore, in various embodiments, the copolymers can have a melt viscosity at 190° C. of at least 100, 500, 1,000, 3,000, or 5,000 and/or not more than about 100,000, 75,000, 50,000, 35,000, or 25,000 cP as measured according to ASTM D3236. Moreover, the copolymers can have a melt viscosity at 190° C. in the range of 100 to 100,000, 500 to 75,000, 1,000 to 50,000, 3,000 to 35,000, or 5,000 to 25,000 cP as measured according to ASTM D3236.

According to one or more embodiments, the copolymers can have a Brookfield viscosity at 190° C. of at least 100, 300, 500, or 750 and/or not more than 30,000, 10,000, 5,000, or 2,500 cps as measured according to ASTM D3236. Moreover, the copolymers can have a Brookfield viscosity at 190° C. in the range of 100 to 30,000, 300 to 10,000, 500 to 5,000, or 750 to 2,500 cps.

In one or more embodiments, the copolymers described herein can also have a number average molecular weight ($M_n$) of less than 100,000, 50,000, or 25,000 as determined by gel permeation chromatography.

In various embodiments, the copolymers described herein do not exhibit substantial changes in color when subjected to storage conditions at elevated temperatures over extended periods of time. Before any aging due to storage occurs, the inventive copolymers can have an initial Gardner color of less than 4, 3, 2, or 1 as measured according to ASTM D1544. After being heat aged at 177° C. for at least 96 hours, the inventive copolymers can exhibit a final Gardner color of less than 7, 5, 3, or 2 as measured according to ASTM D1544.

Thus, the inventive copolymers can retain a desirable color even after prolonged storage and exposure.

Additionally, the copolymers described herein can be amorphous or semi-crystalline. As used herein, "amorphous" means that the copolymers have a crystallinity of less than 5 percent as measured using Differential Scanning calorimetry ("DSC") according to ASTM E 794-85. As used herein, "semi-crystalline" means that the copolymers have a crystallinity in the range of 5 to 40 percent as measured using DSC according to ASTM E 794-85. In various embodiments, the copolymers can have a crystallinity of not more than 60, 40, 30, 20, 10, 5, 4, 3, 2, or 1 percent as measured using DSC according to ASTM E 794-85.

The Processes for Producing the Propylene-Ethylene Copolymers

In various embodiments, the copolymers can be produced by reacting propylene monomers and ethylene monomers in the presence of a catalyst system comprising at least one electron donor.

In various embodiments, the catalyst system can comprise a Ziegler-Natta catalyst. According to one or more embodiments, the Ziegler-Natta catalyst can contain a titanium-containing component, an aluminum component, and an electron donor. In certain embodiments, the catalyst comprises titanium chloride on a magnesium chloride support.

The catalyst systems, in certain embodiments, can comprise a heterogeneous-supported catalyst system formed from titanium compounds in combination with organoaluminum co-catalysts. In various embodiments, the co-catalyst can comprise an alkyl aluminum co-catalyst ("TEAL").

In one or more embodiments, the catalyst system can have an aluminum to titanium molar ratio of at least 1:1, 5:1, 10:1, or 15:1 and/or not more than 100:1, 50:1, 35:1, or 25:1. Moreover, the catalyst system can have an aluminum to titanium molar ratio in the range of 1:1 to 100:1, 5:1 to 50:1, 10:1 to 35:1, or 15:1 to 25:1. Additionally or alternatively, in various embodiments, the catalyst system can have a molar ratio of aluminum to silicon of at least 0.5:1, 1:1, 2:1, 3:1, 4:1, 5:1, or 6:1 and/or not more than 100:1, 50:1, 35:1, 20:1, 15:1, 10:1, or 8:1. Moreover, the catalyst system can have a molar ratio of aluminum to silicon in the range of 0.5:1 to 100:1, 1:1 to 50:1, 2:1 to 35:1, 2:1 to 20:1, 2:1 to 15:1, 2:1 to 10:1, or 2:1 to 8:1.

Electron donors are capable of increasing the copolymer's stereospecificity. However, it can be important to closely regulate the contents of the electron donors since they can suppress catalyst activity to unacceptable levels in some circumstances. The electron donors used during the polymerization process can include, for example, organic esters, ethers, alcohols, amines, ketones, phenols, phosphines, and/or organosilanes. Furthermore, the catalyst system can comprise internal donors and/or external donors.

In various embodiments, the catalyst system comprises at least one external electron donor. In one or more embodiments, the external electron donor comprises at least one alkoxy silane. In particular, in certain embodiments, the alkoxy silane can comprise dicyclopentyldimethoxysilane, cyclohexylmethyldimethoxysilane, or a combination thereof. Moreover, in some embodiments, the alkoxy silane can comprise, consist essentially of, or consist entirely of dicyclopentyldimethoxysilane.

It has been observed that the addition of the above external donors to the catalyst system can increase the hardness (i.e., decrease the needle penetration) and viscosities of the copolymers. However, contrary to what has been previously observed in the art, the electron donors described above can actually lower the softening points of the produced copolymers instead of increasing it. Furthermore, it has been observed that substantially all (i.e., greater than 95 percent) of the ethylene added to the reactor during the polymerization process can react when the above electron donors are used. Thus, this can result in copolymers having higher ethylene contents and lower propylene contents. Consequently, when using the above electron donors, propylene-ethylene copolymers can be produced that have higher ethylene contents, but still exhibit desired balances between softening point and hardness.

In addition, according to various embodiments, the catalyst system can have a molar ratio of electron donor to titanium of at least 0.1:1, 0.5:1, 1:1, 1.25:1, 1.5:1, or 2:1 and/or not more than 20:1, 15:1, 10:1, 5:1, 4.5:1, or 4:1. Moreover, the catalyst system can have a molar ratio of electron donor to titanium in the range of 0.1:1 to 20:1, 0.5:1 to 15:1, 1:1 to 10:1, 1.25:1 to 5:1, 1.5:1 to 4.5:1, or 2:1 to 4:1. Additionally or alternatively, in various embodiments, the catalyst system can comprise a molar ratio of TEAL co-catalyst to the electron donor of at least 0.5:1, 1:1, 2:1, 3:1, 4:1, 5:1, or 6:1 and/or not more than 100:1, 50:1, 35:1, 20:1, 15:1, 10:1, or 8:1. Moreover, the catalyst system can comprise a molar ratio of TEAL co-catalyst to the electron donor in the range of 0.5:1 to 100:1, 1:1 to 50:1, 2:1 to 35:1, 2:1 to 20:1, 2:1 to 15:1, 2:1 to 10:1, or 2:1 to 8:1. In certain embodiments, the type of electron donor can influence the necessary TEAL/electron donor ratio. For instance, in embodiments where the electron donor is dicyclopentyldimethoxysilane, the TEAL/electron donor ratio can be less than 20:1.

The catalyst system can exhibit a catalyst activity in the range of 200 to 2,000, 400 to 1,200, or 500 to 1,000 g/g. Catalyst activity is calculated by measuring the ratio of the weight the polymer made in the reactor to the weight of the catalyst charged into the reactor. These measurements are based on a reaction time of one hour.

Since the addition of external donors can increase viscosity and molecular weight, the addition of hydrogen can be required to act as a chain terminator during polymerization. For example, the process can be carried out at a hydrogen pressure in the range of 5 to 100, 10 to 80, or 15 to 50 psig.

In various embodiments, the polymerization reaction can occur at a temperature in the range of 100 to 200, 110 to 180, or 120 to 150° C. Furthermore, the polymerization reaction can be carried out a pressure in the range of 500 to 2,000, 700 to 1,500, or 800 to 1,250 psig.

In certain embodiments, the reactor can comprise a stirred reactor and the polymerization reaction can have a residence time in the reactor in the range of 0.1 to 6, 0.5 to 4, or 1 to 2 hours. In various embodiments, the ethylene can be added to the reactor as a gas and the propylene can be added as a liquid.

End Products Incorporating the Propylene-Ethylene Copolymers

The copolymers described herein can be utilized in a wide array of applications including, for example, adhesives, sealants, roofing membranes, waterproof membranes and underlayments, carpet, laminated articles, tapes (e.g. tamper evident tapes, water activated tapes, gummed tape, sealing tape, scrim reinforced tape, veneer tape, reinforced and non-reinforced gummed paper tape, box makers tape, paper tape, packaging tape, duct tape, masking tape, invisible tape, electrical tape, gaffer tape, hockey tape, medical tape, etc.), labels (e.g. general purpose label, beverage label, freezer label, smart label, consumer electronics etc.), mastics, polymer blends, wire coatings, molded articles, and rubber additives. In certain embodiments, the copolymers described herein can be utilized in adhesives, such as, for example, hotmelt adhesives, water based adhesives, solvent based adhesives, hot melt pressure-sensitive adhesives, solvent-based pressure-sensitive adhesives, hot melt nonwoven/hygiene adhesives, and hot melt packaging adhesives. In particular, due to their unique combination of softening point and needle penetration as previously described, adhesives produced from the inventive copolymers can be utilized in a vast array of end products, including hygienic packaging and other packaging applications. In many embodiments, the various properties of the inventive copolymers, such as softening point and needle penetration, can be selected to suit the intended end use of the composition incorporating the copolymers.

Furthermore, in various embodiments, the inventive copolymers described herein can also be used to modify existing polymer blends that are typically utilized in plastics, elastomeric applications, roofing applications, cable filling, and tire modifications. The inventive copolymers can improve the adhesion, processability, stability, viscoelasticity, thermal properties, and mechanical properties of these polymer blends.

In various embodiments, the inventive copolymers can be modified to produce graft copolymers. In such embodiments, the inventive copolymers can be grafted with maleic anhydride, fumarate and maleate esters, methacrylate esters (e.g., glycidyl methacrylate and hydroxethyl methacrylate), methacrylic acid, vinyl derivatives, silane derivatives, or combinations thereof. These graft copolymers can be produced using any conventional process known in the art including, for example, transesterification and free radical induced coupling.

The various end uses and end products noted above can utilize the inventive copolymer by itself or can combine it with other additives and polymers. Suitable polymers that can be combined with the inventive copolymers to form a polymer blend may include, for example, isoprene-based block copolymers; butadiene-based block copolymers; hydrogenated block copolymers; ethylene vinyl acetate copolymers; polyester; polyester-based copolymers; neoprene; urethane; polyacrylate; acrylate copolymers such as ethylene acrylic acid copolymer, ethylene n-butyl acrylate copolymer, and ethylene methyl acrylate copolymer; polyether ether ketone; polyamide; styrenic block copolymers; hydrogenated styrenic block copolymers; random styrenic copolymers; ethylene-propylene rubber; ethylene vinyl acetate copolymer; butyl rubber; styrene butadiene rubber; butadiene acrylonitrile rubber; natural rubber; polyisoprene; polyisobutylene; polyvinyl acetate; polyethylene; polypropylene including atactic polypropylene; a terpolymer formed from the ethylene, propylene, and a diene (EPDM); metallocene-catalyzed polypropylene polymers; ethylene-butene copolymers; ethylene-hexene copolymers; ethylene-octene copolymers; ethylene-dodecene copolymers; propylene-butene copolymers; propylene-hexene copolymers; propylene-octene copolymers; and propylene-dodecene copolymers.

In various embodiments, the copolymers described herein can be used to produce a hot melt adhesive. According to one or more embodiments, the adhesives can comprise at least 1, 5, 10, 20, 30, or 40 and/or not more than 95, 90, 80, 70, 60, or 55 weight percent of the inventive copolymer. Moreover, the adhesives can comprise in the range of 1 to 95, 5 to 90, 10 to 80, 20 to 70, 30 to 60, or 40 to 55 weight percent of the inventive copolymers. In certain embodiments, the adhesive can be entirely comprised of the inventive copolymer.

Furthermore, depending on the intended end use, these hot melt adhesives can also comprise various additives including, for example, polymers, tackifiers, processing oils, waxes, antioxidants, plasticizers, pigments, and fillers.

In various embodiments, the adhesives can comprise at least 10, 20, 30, or 40 and/or not more than 90, 80, 70, or 55 weight percent of at least one polymer that is different from the inventive copolymers. Moreover, the adhesives can comprise in the range of 10 to 90, 20 to 80, 30 to 70, or 40 to 55 weight percent of at least one polymer that is different from the inventive copolymers. These polymers can include any of the polymers listed above.

In various embodiments, the adhesives can comprise at least 10, 20, 30, or 40 and/or not more than 90, 80, 70, or 55 weight percent of at least one tackifier. Moreover, the adhesives can comprise in the range of 10 to 90, 20 to 80, 30 to 70, or 40 to 55 weight percent of at least one tackifer. Suitable tackifiers can include, for example, cycloaliphatic hydrocarbon resins, $C_5$ hydrocarbon resins; $C_5/C_9$ hydrocarbon resins; aromatically-modified $C_5$ resins; $C_9$ hydrocarbon resins; pure monomer resins such as copolymers or styrene with alpha-methyl styrene, vinyl toluene, para-methyl styrene, indene, methyl indene, $C_5$ resins, and $C_9$ resins; terpene resins; terpene phenolic resins; terpene styrene resins; rosin esters; modified rosin esters; liquid resins of fully or partially hydrogenated rosins; fully or partially hydrogenated rosin esters; fully or partially hydrogenated modified rosin resins; fully or partially hydrogenated rosin alcohols; fully or partially hydrogenated $C_5$ resins; fully or partially hydrogenated $C_5/C_9$ resins; fully or partially hydrogenated aromatically-modified $C_5$ resins; fully or partially hydrogenated $C_9$ resins; fully or partially hydrogenated pure monomer resins; fully or partially hydrogenated $C_5$/cycloaliphatic resins; fully or partially hydrogenated $C_5$/cycloaliphatic/styrene/$C_9$ resins; fully or partially hydrogenated cycloaliphatic resins; and combinations thereof. Exemplary commercial hydrocarbon resins include Regalite™ hydrocarbon resins (Eastman Chemical).

In various embodiments, the adhesives can comprise at least 1, 2, 5, 8, or 10 and/or not more than 40, 30, 25, or 20 weight percent of at least one processing oil. Moreover, the adhesives can comprise in the range of 2 to 40, 5 to 30, 8 to 25, or 10 to 20 weight percent of at least one processing oil. Processing oils can include, for example, mineral oils, naphthenic oils, paraffinic oils, aromatic oils, castor oils, rape seed oil, triglyceride oils, or combinations thereof. As one skilled in the art would appreciate, processing oils may also include extender oils, which are commonly used in adhesives. The use of oils in the adhesives may be desirable if the adhesive is to be used as a pressure-sensitive adhesive to produce tapes or labels or as an adhesive to adhere nonwoven articles. In certain embodiments, the adhesive may not comprise any processing oils.

In various embodiments, the adhesives can comprise at least 1, 2, 5, 8, or 10 and/or not more than 40, 30, 25, or 20 weight percent of at least one wax. Moreover, the adhesives can comprise in the range of 1 to 40, 5 to 30, 8 to 25, or 10 to 20 weight percent of at least one wax. Suitable waxes can include, for example, microcrystalline wax, paraffin wax, waxes produced by Fischer-Tropsch processes, functionalized waxes (maleated, fumerated, or wax with functional groups etc.) and vegetable wax. The use of waxes in the adhesives may be desirable if the adhesive is to be used as a hot melt packaging adhesive. In certain embodiments, the adhesive may not comprise a wax.

In various embodiments, the adhesives can comprise at least 0.1, 0.5, 1, 2, or 3 and/or not more than 20, 10, 8, or 5 weight percent of at least one antioxidant. Moreover, the adhesives can comprise in the range of 0.1 to 20, 1 to 10, 2 to 8, or 3 to 5 weight percent of at least one antioxidant.

In various embodiments, the adhesives can comprise at least 0.5, 1, 2, or 3 and/or not more than 20, 10, 8, or 5 weight percent of at least one plasticizer. Moreover, the adhesives can comprise in the range of 0.5 to 20, 1 to 10, 2 to 8, or 3 to 5 weight percent of at least one plasticizer. Suitable plasticizers can include, for example, dibutyl phthalate, dioctyl phthalate, chlorinated paraffins, and phthalate-free plasticizers. Commercial plasticizers can include, for example, Benzoflex™ plasticizers (Eastman Chemical) and Eastman 168™ (Eastman Chemical).

In various embodiments, the adhesives can comprise at least 10, 20, 30, or 40 and/or not more than 90, 80, 70, or 55 weight percent of at least one filler. Moreover, the adhesives can comprise in the range of 1 to 90, 20 to 80, 30 to 70, or 40 to 55 weight percent of at least one filler. Suitable fillers can include, for example, carbon black, calcium carbonate, titanium oxide, zinc oxide, or combinations thereof.

The adhesive compositions can be produced using conventional techniques and equipment. For example, the components of the adhesive composition may be blended in a mixer such as a sigma blade mixer, a plasticorder, a brabender mixer, a twin screw extruder, or an in-can blend (pint-cans). In various embodiments, the adhesive may be shaped into a desired form, such as a tape or sheet, by an appropriate technique including, for example, extrusion, compression molding, calendaring or roll coating techniques (e.g., gravure, reverse roll, etc.), curtain coating, slot-die coating, or spray coating.

Furthermore, the adhesive may be applied to a substrate by solvent casting processes or by melting the adhesive and then using conventional hot melt adhesive application equipment known in the art. Suitable substrates can include, for example, nonwoven, textile fabric, paper, glass, plastic, films (Polyethylene, Polypropylene, Polyester etc.), and metal. Generally, about 0.1 to 100 g/m² of the adhesive composition can be applied to a substrate.

According to one or more embodiments, the hot melt adhesives can have a Brookfield viscosity at 177° C. of at least 100, 300, 500, or 750 and/or not more than 30,000, 10,000, 5,000, or 2,500 cps as measured according to ASTM D3236. Moreover, the hot melt adhesives can have a Brookfield viscosity at 177° C. in the range of 100 to 30,000, 300 to 10,000, 500 to 5,000, or 750 to 2,500 cps. Additionally or alternatively, the hot melt adhesives can have a loop tack of 0.1, 0.5, 1, or 1.5 and/or not more than 20, 15, 10, or 5 lbf as measured according to ASTM D6195. Moreover, the hot melt adhesives can have a loop tack in the range of 0.1 to 20, 0.5 to 15, 1 to 10, or 1.5 to 5 lbf as measured according to ASTM D6195.

Furthermore, in various embodiments, the hot melt adhesives can have a peel strength of at least 1, 2, 5, 10, or 15 and/or not more than 50, 40, 35, 30, or 25 g/mm as measured according to ASTM D903. Moreover, the hot melt adhesives can have a peel strength in the range of 1 to 50, 2 to 40, 5 to 35, 10 to 30, or 15 to 25 g/mm as measured according to ASTM D903. Additionally or alternatively, the hot melt adhesives can have a 90° peel strength of at least 0.05, 0.1, 0.2, or 0.5 and/or not more than 20, 10, 5, or 1 lbf/inch as measured according to ASTM D903. Moreover, the hot melt adhesives can have a 90° peel strength in the range of 0.05 to 20, 0.1 to 10, 0.2 to 5, or 0.5 to 1 lbf/inch as measured according to ASTM D903.

According to various embodiments, the adhesives containing the inventive copolymers can have a broad operating window and may have an application window from 80 to 230° C. This broad operating window can be demonstrated by the peel strengths of the adhesives at different temperatures. Add-on level can be from 0.5-30 gsm. In one or more embodiments, the hot melt adhesives can have a peel strength for samples applied at lower temperature (such as 100-145° C.) of at least 2, 5, 25, or 40 and/or not more than 250, 200, or 175 g/mm as measured according to ASTM D903. Moreover, the hot melt adhesives can have a peel strength for samples applied at lower temperature (such as 100-145° C.) in the range of 2 to 250, 25 to 200, or 40 to 175 g/mm as measured according to ASTM D903. Additionally or alternatively, the hot melt adhesives can have a peel strength at for samples applied at higher temperature (such as 145-180° C.)—of at least 1, 5, 30, or 40 and/or not more than 250, 200, or 150 g/mm as measured according to ASTM D903. Moreover, the hot melt adhesives can have a peel strength for samples applied at higher temperature (such as 145-180° C.) in the range of 1 to 250, 30 to 200, or 40 to 150 g/mm as measured according to ASTM D903.

According to one or more embodiments, the hot melt adhesives can have a probe tack of at least 0.1, 0.2, or 0.3 and/or not more than 5, 3, 2, or 1 kg as measured according to ASTM D9279. Moreover, the hot melt adhesives can have a probe tack in the range of 0.1 to 3, 0.2 to 2, or 0.3 to 5 kg as measured according to ASTM D9279. Furthermore, in various embodiments, the hot melt adhesives can have a holding power of at least 0.1, 0.5, or 1 and/or not more than 50000, 10000, 5000, 1000, 500, 100, 50, 20, 10, 7, or 4 hours as measured according to ASTM D3654. Moreover, the hot melt adhesives can have a holding power in the range of 0.1 to 10, 0.5 to 7, or 1 to 4 hours as measured according to ASTM D3654.

According to various embodiments, the hot melt adhesives can have a peel adhesion failure temperature ("PAFT") of at least 2, 10, 25, or 45 and/or not more than 200, 120, or 80° C. as measured according to ASTM D4498. Moreover, the hot melt adhesives can have a PAFT in the range of 2, 10 to 200, 25 to 120, or 45 to 80° C. as measured according to ASTM D4498. Additionally or alternatively, the hot melt adhesives can have a shear adhesion failure temperature ("SAFT") of at least 2, 5, 10, 25, 50, or 75 and/or not more than 200, 150, or 125° C. as measured according to ASTM D4498. Moreover, the hot melt adhesives can have a SAFT in the range of 2 to 200, 50 to 150, or 75 to 125° C. as measured according to ASTM D4498.

In various embodiments, the adhesives containing the inventive copolymers do not exhibit substantial changes in color when subjected to storage conditions at elevated temperatures over extended periods of time. Before any aging due to storage occurs, the adhesives can have an initial Gardner color of less than 18, 15, 10, 8, 5, 4, 3, 2, or 1 as measured according to ASTM D1544. After being heat aged at 177° C. for at least 96 hours, the adhesives can exhibit a final Gardner color of less than 18, 15, 10, 7, 5, 3, 2 or 1 as measured according to ASTM D1544. Thus, the adhesives can retain a desirable color even after prolonged storage and exposure.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

In this example, various propylene-ethylene copolymers were produced in a two-liter stirred reactor with an average residence time of about one hour. The reactor temperature was maintained at approximately 140° C. and a pressure of 900 psig. The propylene was fed into the reactor as a liquid, while the ethylene was fed into the reactor as a gas. The polymerization occurred in the presence of a Ziegler-Natta catalyst, which was a titanium chloride on a magnesium chloride support. This particular catalyst is a heterogeneous-supported catalyst system formed from titanium compounds in combination with alkyl aluminum co-catalyst ("TEAL"). The catalyst system contained an Al/Ti mole ratio of 21. Any unreacted monomer and other vapors were vented from the reactor upon discharge of the copolymer.

Samples 1-11 were produced using the aforementioned catalyst system and an external electron donor. As noted below, the electron donor was either cyclohexylmethyldimethoxysilane ("C") or dicyclopentyldimethoxysilane ("D"). Comparative sample 1 (C1) was produced using the above catalyst system in the absence of any electron donors. The amount of added electron donor varied for each sample as indicated by Donor/Ti molar ratio.

The copolymers produced from this reaction are described in TABLE 1 below, along with their various properties and the reaction conditions used to produce them. It should be noted that needle penetration was measured using a penetrometer in accordance with ASTM D5 as discussed previously without actually running the specimens in water; however, the specimens were conditioned in water prior to running the test.

increase viscosity and molecular weight, the addition of hydrogen, or a higher level of hydrogen, can be required to act as a chain terminator during polymerization compared to polymerization of a similar composition with no external donor added.

Figure 1B:
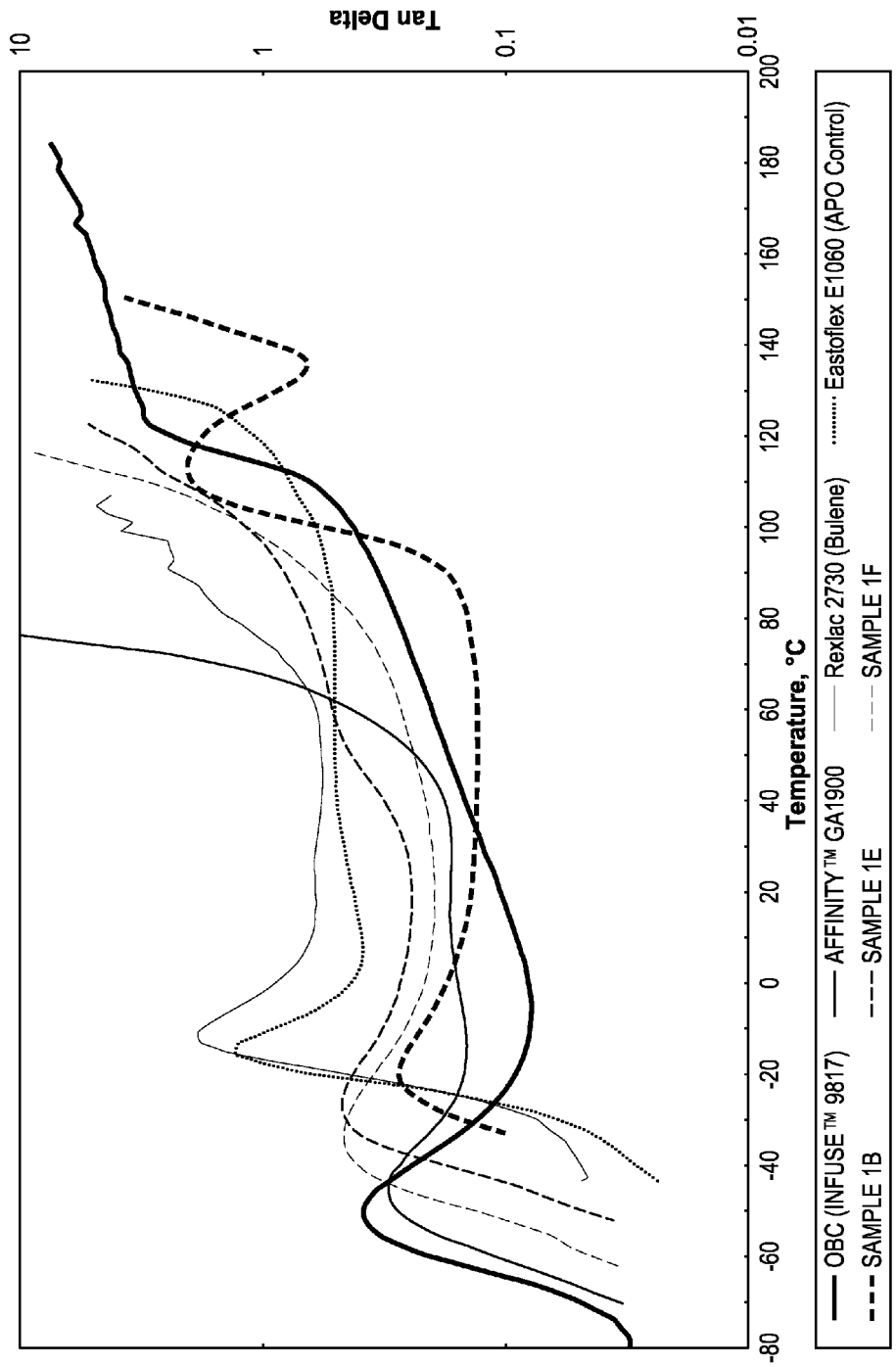
FIG. 1B depicts the viscoelastic characteristics of particular propylene-ethylene copolymers produced in Example 1.

FIGS. 1A and 1B depict the viscoelastic characteristics of Samples 1B, 1E, and 1F from TABLE 1. Furthermore, FIGS. 1A and 1B also provide the viscoelastic characteristics of various commercially-available copolymers to serve as a comparison. These commercially-available copolymers include INFUSE™ 9817 (Dow), AFFINITY™ GA1900 (Dow), and Eastoflex™ E1060 (Eastman). FIG. 1A depicts the elastic modulus (G') of the copolymers, while FIG. 1B depicts the tan delta of the copolymers.

As shown in FIGS. 1A and 1B, Sample 1B showed a desirable elastic modulus (G') plateau from −15 to 100° C., representing the elastic characteristics over a wide application temperature range. This is important in hot melt pressure sensitive adhesives ("PSA") applications, such as tapes and labels, because the G' plateau (i.e., the flatness of the curve) typically represents the energy absorption and desorption characteristics, as well as the strength of the adhesive over a

TABLE 1

| | Copolymer Sample | | | | | | | | | | | |
|---|---|---|---|---|---|---|---|---|---|---|---|---|
| | 1A | 1B | 1C | 1D | 1E | 1F | 1G | 1H | 1I | 1J | 1K | C1 |
| Al/Ti mole ratio | 21 | 21 | 21 | 21 | 21 | 21 | 21 | 21 | 21 | 21 | 21 | 21 |
| Silane Donor | C | C | D | D | D | D | D | D | D | D | D | — |
| Donor/Ti, mole ratio | 0.5 | 1.2 | 1.0 | 2.0 | 2.0 | 2.0 | 2.5 | 2.5 | 3.0 | 2.0 | 2.0 | — |
| Hydrogen (psig) | 40 | 20 | 15 | 25 | 25 | 40 | 40 | 25 | 50 | 80 | 80 | — |
| Reactor Temp, ° C. | 140 | 140 | 140 | 140 | 140 | 140 | 140 | 140 | 140 | 140 | 140 | 140 |
| Reactor Press. (psig) | 900 | 900 | 900 | 900 | 900 | 900 | 900 | 900 | 900 | 900 | 900 | 900 |
| Catalyst Activity (g/g) | 714.3 | 1003.3 | 920.4 | 887.8 | 817.1 | 728.4 | 803.1 | 842.9 | 780.8 | 824.3 | 841.7 | — |
| Visc. @ 190° C., cP | 1853 | 5863 | 9088 | 9838 | 21125 | 6850 | 10238 | 16575 | 5525 | 1122 | 1748 | 7013 |
| Softening Point (° C.) | 130.3 | 142.2 | 134.8 | 131.6 | 128.6 | 121.8 | 126.3 | 132.6 | 119 | 117.7 | 129.1 | 120.7 |
| Needle Pen. (dmm) | 20 | 14 | 15 | 29 | 17 | 20 | 22 | 21 | 28 | 26 | 20 | 82 |
| Wt. % Ethylene | 15.2 | 12.5 | 17.5 | 24.6 | 20.2 | 22.6 | 25.3 | 22.6 | 25.2 | 21.1 | 19.5 | 21.7 |
| Wt. % Propylene | 84.8 | 87.5 | 82.5 | 75.4 | 79.8 | 77.4 | 74.7 | 77.4 | 74.8 | 78.9 | 80.5 | 78.3 |
| Poly Yield (g) | 537.5 | 780.0 | 709.6 | 712.9 | 656.1 | 584.9 | 657.7 | 690.3 | 652.0 | 661.9 | 675.9 | 720.9 |

As shown above in TABLE 1, the addition of the external donor generally increased hardness, which was indicated by a decrease in needle penetration, along with increasing the softening point and viscosity of the copolymers. As depicted in TABLE 1, samples produced with the external donor had significantly lower needle penetration values than the comparative sample (C1). Furthermore, it was observed that the comparative sample was very tacky, but still lacked the strength of the samples represented by needle penetration values below 30 dmm.

Previous studies indicate that external donor levels greater than 1.25:1 (donor:Ti molar ratio) start to adversely impact properties of the copolymers. In contrast to these studies, it was observed in this example that polymer properties improved at external donor levels of greater than 1.25:1 (donor:Ti molar ratio). Since the addition of external donors can measured temperature range. After the plateau, the copolymer can start to flow. Previously, the flat nature of G' for olefinic copolymers was only achievable through specialized catalytic processes (metallocene catalysis) and/or incorporation of alpha-olefins.

Example 2

In this example, various propylene-ethylene copolymers were produced using the process and system described in Example 1; however, the external electron donor used in this example was cyclohexylmethyldimethoxysilane. Furthermore, the amounts of electron donor added for each sample were varied as indicated by the donor/Ti molar ratio. The copolymers produced during this process are described in TABLE 2 below, along with their various properties and the reaction conditions used to produce them.

TABLE 2

| | Copolymer Sample | | | | | | |
|---|---|---|---|---|---|---|---|
| | 2A | 2B | 2C | 2D | 2E | 2F | 2G |
| Al/Ti mole ratio | 21 | 21 | 21 | 21 | 21 | 21 | 21 |
| Donor/Ti, mole ratio | 1.1 | 1.2 | 0.5 | 1.0 | 1.0 | 1.5 | 2.0 |
| TEAL/Donor, mole ratio | 31.3 | 29.6 | 70.0 | 32.9 | 32.9 | 24.7 | 16.5 |
| Hydrogen (psig) | 40 | 20 | 20 | 25 | 25 | 25 | 25 |
| Reactor Temp, °C. | 140 | 140 | 140 | 140 | 140 | 140 | 140 |
| Reactor Press. (psig) | 900 | 900 | 900 | 900 | 900 | 900 | 900 |
| Catalyst Activity (g/g) | 843.9 | 1003.3 | 1006.8 | 1001.3 | 957.2 | 962.9 | 904.1 |
| Visc. @ 190° C., cP | 3600 | 6600 | 5175 | 4865 | 7263 | 5538 | 4715 |
| Softening Point (° C.) | 140.3 | 138.4 | 145.3 | 126.6 | 135.9 | 133 | 129.6 |
| Needle Pen. (dmm) | 10 | 14 | 17 | 32 | 24 | 23 | 32 |
| Wt. % Ethylene Flow | 10.0 | 10.0 | 10.0 | 15.0 | 13.0 | 15.0 | 15.0 |
| Wt. % Ethylene | 11.7 | 11.9 | 11.3 | 19.3 | 17.2 | 18.2 | 19.3 |
| Wt. % Propylene | 88.3 | 88.1 | 88.7 | 80.7 | 82.8 | 81.8 | 80.7 |
| Poly Yield (g) | 648.7 | 780.0 | 760.1 | 772.0 | 738.0 | 757.8 | 726.0 |

As depicted in TABLE 2, the use of cyclohexylmethyldimethoxysilane as the external donor was able to produce copolymers with a desirable combination of needle penetration and softening point. However, this balance was largely affected by the donor/Ti molar ratio. As shown in Samples 2F and 2G in TABLE 2, when the donor/Ti molar ratio was increased from 1.5:1 to 2:1, there was a slight decrease in softening point and a significant increase in needle penetration, which was not desirable.

Example 3

In this example, various propylene-ethylene copolymers were produced using the process and system described in Example 1. The external electron donor used in this example was dicyclopentyldimethoxysilane. Furthermore, the amounts of electron donor added for each sample was varied as indicated by the donor/Ti molar ratio. The copolymers produced during this process are described in TABLE 3 below, along with their various properties and the reaction conditions used to produce them

TABLE 3

| | Copolymer Sample | | | | | | | | | | | | | | |
|---|---|---|---|---|---|---|---|---|---|---|---|---|---|---|---|
| | C1 | C2 | 3A | 3B | 3C | 3D | 3E | 3F | 3G | 3H | 3I | 3J | 3K | 3L | 3M |
| Al/Ti mole ratio | 21 | 21 | 21 | 21 | 21 | 21 | 21 | 21 | 21 | 21 | 21 | 21 | 21 | 21 | 21 |
| Donor/Ti, mole ratio | 0.3 | 1.5 | 3.0 | 3.0 | 4.0 | 2.0 | 2.0 | 3.0 | 3.0 | 3.0 | 3.0 | 3.0 | 3.0 | 2.0 | 2.0 |
| TEAL/Donor, mole ratio | 71.0 | 15.8 | 7.0 | 7.0 | 5.2 | 10.4 | 10.4 | 7.0 | 7.0 | 7.0 | 7.0 | 7.0 | 7.0 | 10.4 | 10.4 |
| Hydrogen (psig) | 20 | 25 | 80 | 50 | 50 | 80 | 25 | 50 | 33 | 33 | 30 | 30 | 80 | 80 | 80 |
| Reactor Temp, °C. | 140 | 140 | 140 | 140 | 140 | 140 | 140 | 140 | 140 | 140 | 140 | 140 | 140 | 140 | 140 |
| Reactor Press. (psig) | 900 | 900 | 900 | 900 | 900 | 900 | 900 | 900 | 900 | 900 | 900 | 900 | 900 | 900 | 900 |
| Catalyst Activity (g/g) | 862.0 | 1037.1 | 723.2 | 793.4 | 612.8 | 880.6 | 808.8 | 630.1 | 653.5 | 648.1 | 658.6 | 584.1 | 750.9 | 636.9 | 817.1 |
| Visc. @ 190° C., cP | 7613 | 4625 | 1055 | 3150 | 5963 | 1053 | 16425 | 6250 | 86000 | 93100 | 19275 | 16875 | 2332 | 2308 | 1590 |
| Softening Point (° C.) | 140.2 | 143.2 | 114.1 | 109.9 | 97.4 | 128.2 | 136.4 | 119.9 | 132.2 | 135.6 | 123.6 | 118.7 | 117.6 | 122.7 | 128.8 |
| Needle Pen. (dmm) | 22 | 27 | 37 | 40 | 63 | 21 | 23 | 21 | 13 | 8 | 19 | 18 | 20 | 15 | 12 |
| Wt. % Ethylene Flow | 10.0 | 15.0 | 15.0 | 17.5 | 17.5 | 13.0 | 15.0 | 13.0 | 13.0 | 13.0 | 13.0 | 13.0 | 12.0 | 12.0 | 12.0 |
| Wt. % Ethylene | 14.5 | 17.3 | 24 | 25.8 | 31.1 | 18.2 | 21.3 | 24.2 | 20.2 | 20.1 | 22.4 | 24.1 | 19.9 | 22.8 | 18.5 |
| Wt. % Propylene | 85.5 | 82.7 | 76 | 74.2 | 68.9 | 81.8 | 78.7 | 75.8 | 79.8 | 79.9 | 77.6 | 75.9 | 80.1 | 77.2 | 81.5 |
| Poly Yield (g) | 644.0 | 816.2 | 603.9 | 662.5 | 531.3 | 707.1 | 649.5 | 526.1 | 545.7 | 541.2 | 549.9 | 487.7 | 627.0 | 511.4 | 656.1 |

As shown in TABLE 3, the amount of dicyclopentyldimethoxysilane needed to produce copolymers with the desired softening point and needle penetration varies from the amount of cyclohexylmethyldimethoxysilane needed as shown above in Example 2. As demonstrated by comparative samples C1 and C2, dicyclopentyldimethoxysilane levels generally needed to be at 2:1 or greater to achieve the desired properties in the produced copolymers. Moreover, it was observed that copolymers produced using dicyclopentyldimethoxysilane generally had much lower softening points compared to those produced using cyclohexylmethyldimethoxysilane. Furthermore, the copolymers produced using dicyclopentyldimethoxysilane were able to maintain desirable needle penetration values.

Comparing Samples 3C and 3F in TABLE 3 shows that increasing the dicyclopentyldimethoxysilane levels from 3:1 to 4:1 (at 17.5% ethylene flow) results in more ethylene being incorporated into the polymer, thereby yielding a copolymer with a lower softening point.

Another noteworthy result is observed when comparing Samples 3D and 3F, both of which were produced using the same ethylene flow (13%) and had the same needle penetration (21 dmm). However, by increasing the dicyclopentyldimethoxysilane levels from 2:1 to 3:1, Sample 3F unexpectedly had an increased ethylene content (24.2%) compared to Sample 3D (18.2%). This increased amount of ethylene led to the lower softening point in Sample 3F. Furthermore, it is theorized that the propylene portion of Sample 3F is also more stereoregular (i.e., harder) than that of Sample 3D, thereby offsetting the softness that is usually accompanied with a higher ethylene content.

Example 4

Adhesives were produced with Samples 1B, 1E, and 1F from Example 1. The adhesives were produced in pint-sized cans using mechanical agitation with a paddle-type agitator controlled by a variable speed motor with a heat block set at 177° C. The copolymer, along with antioxidant, were introduced into the pint-sized can and heated to 177° C. under a nitrogen blanket. Resin and oil were then introduced into the mixture after the copolymer was melted. In some cases, wax can be also added along with resin and/or oil or in place of resin and/or oil. This mixture was agitated for 30 minutes until it was completely homogenous. After thorough mixing, the adhesive was poured into a silicone-lined cardboard box and allowed to cool. TABLE 4, below, describes the composition and properties of these adhesives. In addition, comparative adhesives were produced using INFUSE™ 9807 block copolymer (Dow) and Kraton® D1102 copolymer (Kraton). It should be noted that the compositional components recited in TABLE 4 are based on weight percentage.

TABLE 4

| Materials | Comparative Adhesive 1 | Comparative Adhesive 2 | Inventive Adhesive 1 | Inventive Adhesive 2 | Inventive Adhesive 3 |
|---|---|---|---|---|---|
| INFUSE ™ 9807 | 20 | | | | |
| Kraton ® D1102 | | 19.7 | | | |
| Copolymer Sample 1B | | | 40 | | |
| Copolymer Sample 1E | | | | 40 | |
| Copolymer Sample 1F | | | | | 40 |
| Regalite ™ S5100 | | 59.7 | | | |
| Regalite ™ R1090 | 54 | | 48.5 | 48.5 | 48.5 |
| Kaydol Mineral Oil | | | 10.5 | 10.5 | 10.5 |
| Calsol 5550 Oil | 25 | 19.6 | | | |
| Irganox ® 1010 | 1 | 1 | 1 | 1 | 1 |
| Total | 100 | 100 | 100 | 100 | 100 |
| 300 mm peel strength (g/mm) | 13.1 | 14.6 | 2.3 | 21.5 | 13.3 |
| Brookfield Visc. 177° C. (cps) | ~1800 | ~1400 | 806 | 2167 | 940 |

Figure 2:
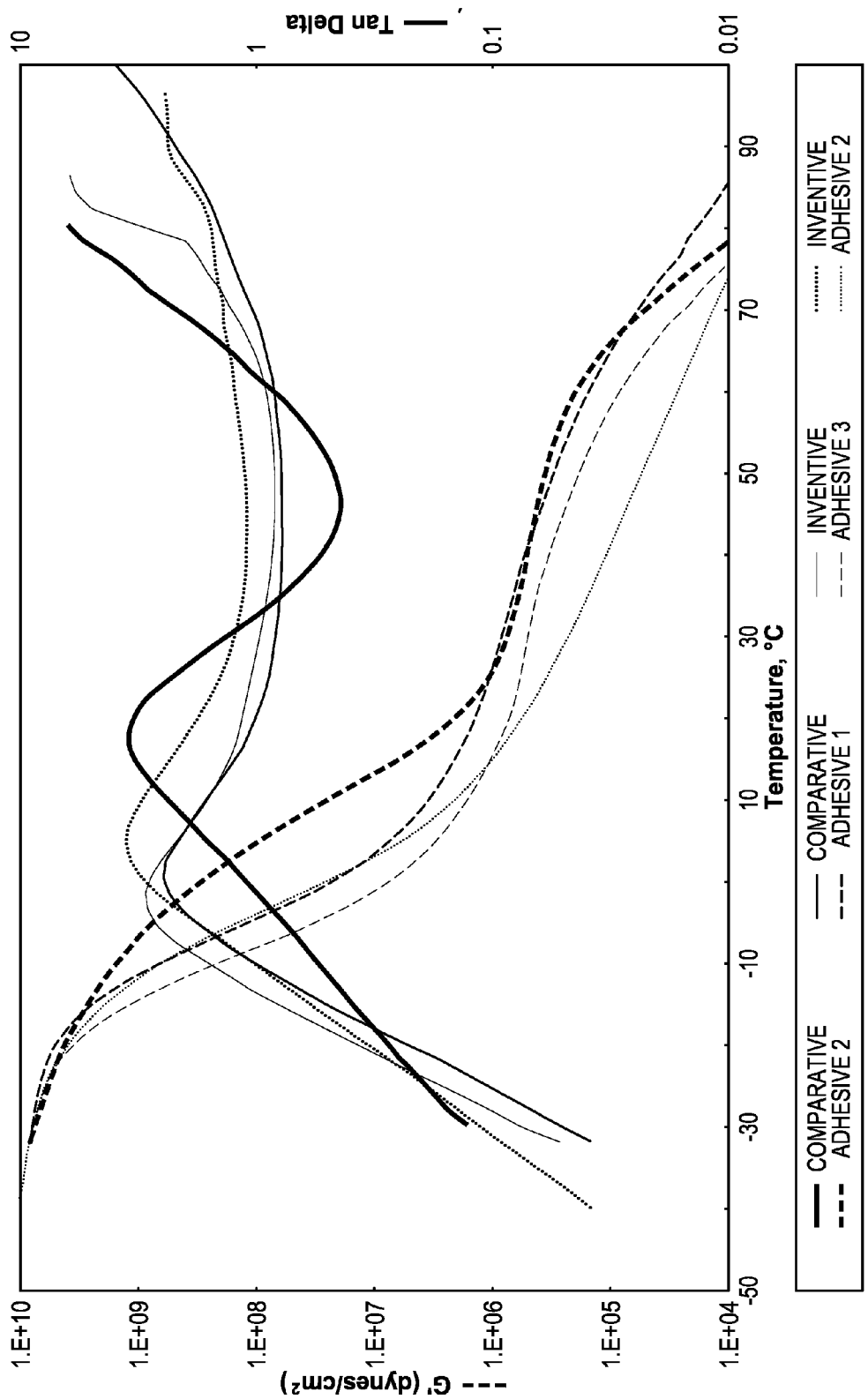
FIG. 2 depicts the viscoelastic characteristics of the adhesives produced in Example 4.

Viscoelastic characteristics of Comparative Adhesive 1, Comparative Adhesive 2, Inventive Adhesive 2, and Inventive Adhesive 3 in TABLE 4 were analyzed using Dynamic Mechanical Analysis ("DMA"). FIG. 2 depicts the viscoelastic characteristics of these adhesives. The adhesives in TABLE 4 were also tested as disposable diaper construction adhesives and were evaluated for adhesive peel strength as measured according to ASTM D903 using Instron after the adhesive had been applied between a nonwoven fabric and polyethylene backing using air-assisted spiral spraying equipment (Acumeter Spray Coater).

Based on FIG. 2 and TABLE 4, the inventive adhesives show similar viscoelastic characteristics to adhesives produced from commercially-available copolymers. Furthermore, the inventive adhesives also exhibited superior strength as indicated by the higher peel strengths.

Example 5

A pressure sensitive adhesive for labels was produced using the process described in Example 4. The adhesive was produced using Sample 1E from Example 1. TABLE 5, below, depicts the compositional makeup of this adhesive.

TABLE 5

| Inventive Adhesive | Weight % |
|---|---|
| Copolymer Sample 1E | 60 |
| Eastotac ™ H100W | 29.5 |
| Calsol 5550 | 9.5 |
| Antioxidant | 1 |

Figure 3:
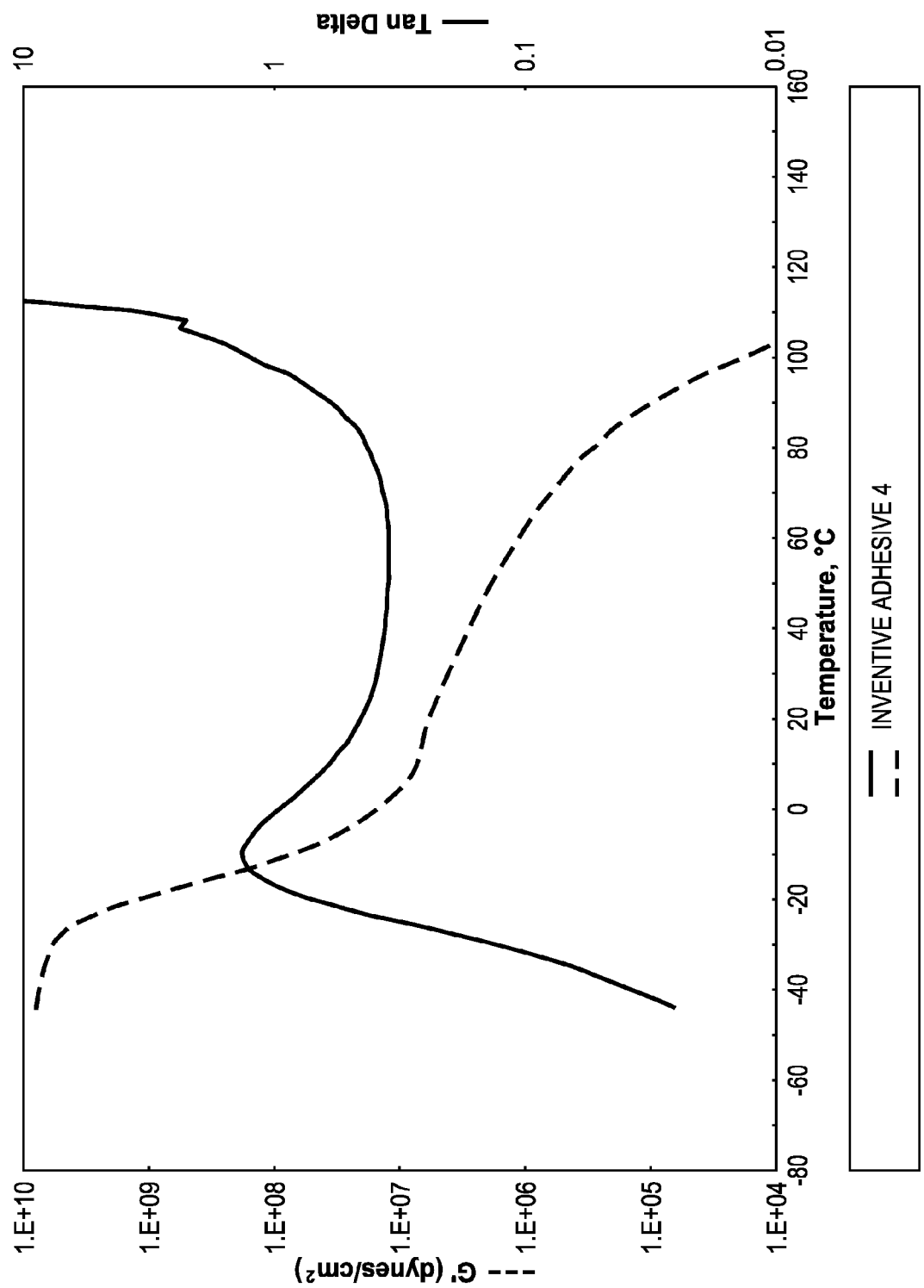
FIG. 3 depicts the viscoelastic characteristics of the adhesive produced in Example 5.

The viscoelastic characteristics of this adhesive were measured using DMA and are depicted in FIG. 3. This adhesive was also evaluated for adhesive peel (90° peel) strength and loop tack using Instron after the adhesive had been directly coated onto vellum using a hot melt knife coater. The adhesive had a 90° peel strength of 0.6 lbf/inch and a loop tack of 1.8 lbf.

Thus, this adhesive can be used as a label adhesive since it exhibits desirable viscoelastic characteristics as shown in FIG. 3 and ideal adhesive peel and tack properties.

Example 6

Hot melt adhesives for packaging applications were produced using the process described in Example 4. All of the adhesives produced for this example comprised 39.8 weight percent of the respective propylene-ethylene copolymer, 39.8 weight percent of Eastotac™ H-100W hydrocarbon resin, 19.9 weight percent of Sasol H1 wax (Sasol), and 0.6 weight percent of antioxidant. It should be noted that some of these adhesives were formed from copolymers produced and described in the previous examples (Samples 1F and 2B), which are noted in TABLE 6 below. As for the remaining listed copolymers (Samples 6A-6D), they were produced in accordance with the process described in Example 1. TABLE 6, below, provides various properties and characteristics of the produced adhesives. Furthermore, TABLE 6 notes the electron donor used to produce the listed copolymers. These electron donors included cyclohexylmethyldimethoxysilane ("C"), dicyclopentyldimethoxysilane ("D"), and tetraethoxysilane ("TEOS"). The adhesives were evaluated for various adhesive properties, such as peel adhesion failure temperature ("PAFT") (ASTM D4498), shear adhesion failure temperature ("SAFT") (ASTM D4498), % fiber tear (ASTM D4498), and open time/set time (ASTM D4497).

TABLE 6

| | | Copolymers in Adhesives | | | | | |
|---|---|---|---|---|---|---|---|
| | | Sample 1F | Sample 2B | Sample 6A | Sample 6B | Sample 6C | Sample 6D |
| Properties of Copolymers | Needle Pen. (dmm) | 20 | 14 | 24 | 24 | 50 | 5 |
| | Softening Point (° C.) | 121.8 | 138.4 | 126.5 | 135.9 | 145.6 | 154.7 |
| | Electron Donor | D | C | D | C | TEOS | C |
| | Wt. % Ethylene | 22.6% | 11.9% | 21.7% | 17.2% | 13.3% | 10% |
| Properties of the Adhesives | % Fiber Tear (135° F.) | 75 | 75 | 25 | 100 | 25 | 0 |
| | % Fiber Tear (Room Temp) | 100 | 0 | 50 | 100 | 100 | 0 |
| | % Fiber Tear (40° F.) | 0 | 0 | 0 | 50 | 50 | 0 |
| | % Fiber Tear (20° F.) | 0 | 0 | 0 | 50 | 75 | 0 |
| | Open Time/ Set Time (sec) | >30/20 | 30/10 | >30/20 | 30/10 | 20/10 | 32/20 |
| | SAFT/PAFT (° C.) | 98/56 | 115/68 | 99/51 | 99/75 | 99.6/74.6 | 100/62 |
| | Brookfield Visc. 177° C. (cps) | 6850 | 6600 | 6700 | 7263 | 8850 | 6313 |

It should be noted that the adhesive produced with Sample 6D did not have any noticeable fiber tear due to its low needle penetration as depicted in TABLE 6.

Figure 4:
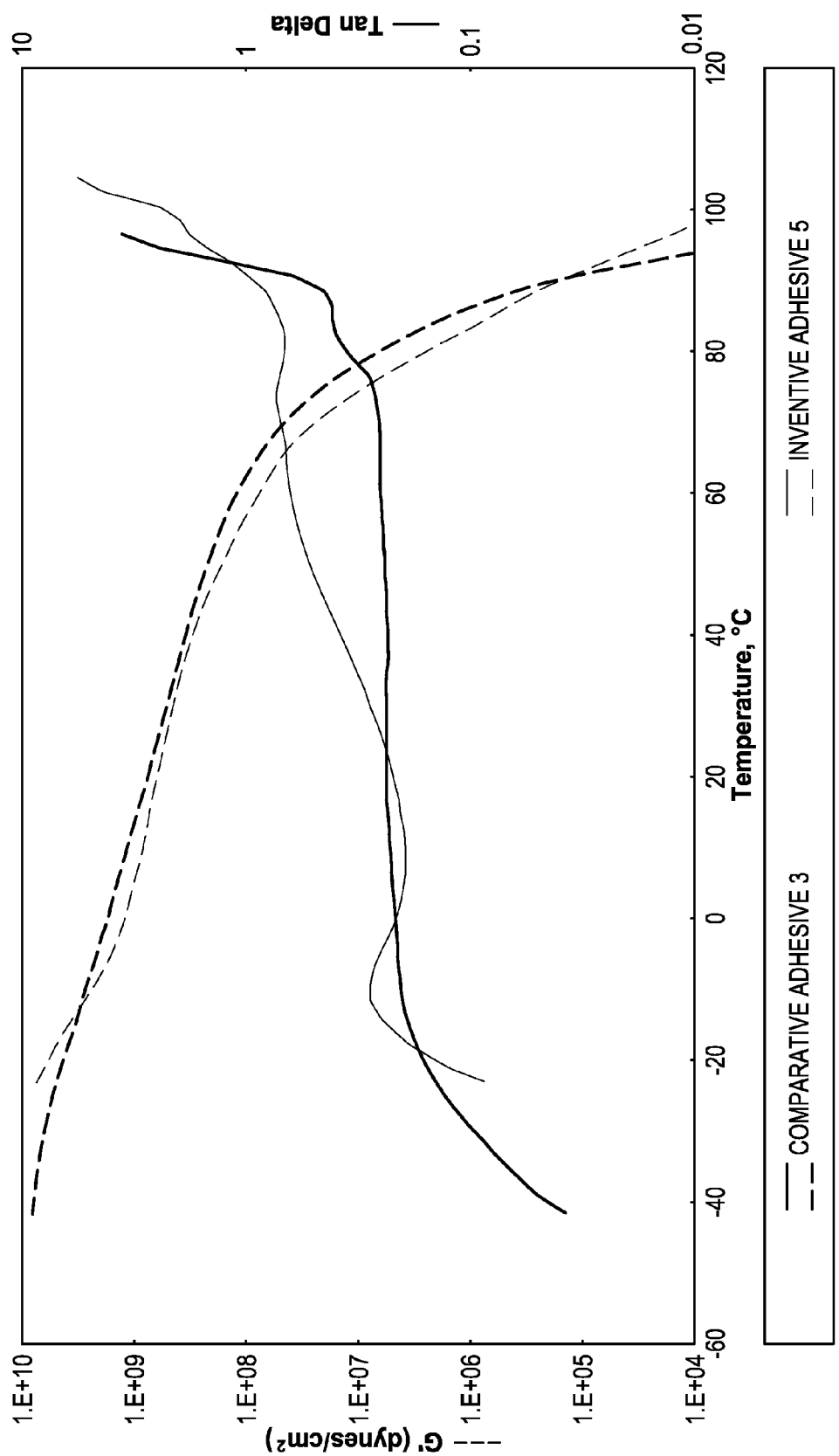
FIG. 4 depicts the viscoelastic characteristics of the adhesives produced in Example 6.

The viscoelastic characteristics of the adhesive produced from Sample 1F (labeled as "Inventive Adhesive 5") are compared in FIG. 4 with an adhesive produced from Affinity™ GA1950 (Dow). This comparative adhesive was produced based on the same formulation used to produce the adhesives in TABLE 6. This comparative adhesive is listed in FIG. 6 as "Comparative Adhesive 3." It should also be noted that this comparative adhesive had a SAFT of 93.6/3.6° C., a PAFT of 71.8/3.4° C., an open time/set time of 15/5 seconds, and a Brookfield viscosity at 177° C. of 177 cps. As shown in FIG. 4 and TABLE 6, the inventive adhesives exhibited desirable viscoelastic characteristics and adhesive properties that are comparable to standard adhesives in the industry.

Example 7

Hot melt adhesives for nonwovens were produced using the inventive propylene-ethylene copolymers and various polymers. The propylene-ethylene copolymers used to manufacture these adhesive samples were produced in accordance with the process described in Example 1. The various properties and characteristics of the copolymers used to produce the adhesive samples are listed in TABLE 7 below. Furthermore, TABLE 7 indicates the electron donor that was used to produce the respective copolymer (cyclohexylmethyldimethoxysilane ("C") or dicyclopentyldimethoxysilane ("D")).

TABLE 7

| | Copolymer Sample | | | |
|---|---|---|---|---|
| | 7A | 7B | 7C | 7D |
| Visc. @ 190° C., cP | 2520 | 2960 | 2590 | 7363 |
| Softening Point (° C.) | 137.5 | 139.4 | 134.1 | 116.1 |
| Needle Pen. (dmm) | 14 | 15 | 14 | 27 |
| Wt. % Ethylene | 11.7 | 11.9 | 11.3 | 19.3 |

TABLE 7-continued

| | Copolymer Sample | | | |
|---|---|---|---|---|
| | 7A | 7B | 7C | 7D |
| Wt. % Propylene | 88.3 | 88.1 | 88.7 | 80.7 |
| Electron Donor | D | C | C | D |

The adhesives were produced in accordance with the process described in Example 4. The adhesives were produced with various polymers and additives including Vistamaxx™ 6202 (ExxonMobil), Infuse™ 9807 (Dow), L-MODU S400 (Idemitsu), Kraton® 1102 (Kraton), Kraton® 1161 (Kraton), Kraton® 1657 (Kraton), Regalite™ R1090 (Eastman Chemical), Kaydol mineral oil (Sonneborn), and Irganox® 1010 (BASF). The Brookfield viscosity and the peel strength of the produced adhesives were measured as described above. TABLE 8, below, describes the composition and properties of these inventive adhesives, which are labeled as "IA." It should be noted that the compositional components recited in TABLE 8 are based on weight percentage and that all components add up to 100 percent; however, this does not include the 1 percent of antioxidant (Irganox® 1010), which was added after all other components were combined. The weight percentage for the antioxidant was based off the combined weight percentage of the other components.

TABLE 8

| | | Adhesives | | | | | | | | |
|---|---|---|---|---|---|---|---|---|---|---|
| | | IA1 | IA2 | IA3 | IA4 | IA5 | IA6 | IA7 | IA8 | IA9 |
| Composition of Adhesives | Sample 7A | 70 | | | | | | | | |
| | Sample 7B | | 70 | | | | | | | |
| | Sample 7C | | | 70 | | | | | | |
| | Sample 7D | | | | 20 | 20 | 20 | 20 | 20 | 20 |
| | Vistamaxx™ 6202 | | | | 20 | | | | | |
| | Infuse™ 9807 | | | | | 20 | | | | |
| | LMODU S400 | | | | | | 20 | | | |
| | Kraton® 1102 (SBS) | | | | | | | 20 | | |
| | Kraton® 1161 (SIS) | | | | | | | | 20 | |
| | Kraton® 1657 (SEBS) | | | | | | | | | 20 |
| | Regalite™ R1090 | 30 | 30 | 30 | 48.5 | 48.5 | 48.5 | 48.5 | 48.5 | 48.5 |
| | Kaydol Mineral Oil | | | | 10.5 | 10.5 | 10.5 | 10.5 | 10.5 | 10.5 |
| | Irganox® 1010 | 1 | 1 | 1 | 1 | 1 | 1 | 1 | 1 | 1 |
| | Brookfield Visc. 177° C. (cps) | 1675 | 1775 | 1430 | 14900 | 7725 | 1250 | 3760 | 7200 | 10250 |
| | Peel strength (g/mm) | 9.8 | 6.6 | 4 | 21.5 | 18.6 | 9.8 | 6.6 | 4 | 21.5 |

As shown in TABLE 8, the inventive adhesives exhibited desirable adhesive properties that are comparable to standard adhesives in the industry.

Example 8

Hot melt adhesives for hygienic applications were produced using the inventive propylene-ethylene copolymers depicted in TABLE 9. The copolymers were produced in accordance with the process described in Example 1 using dicyclopentyldimethoxysilane as the electron donor.

TABLE 9

| | Copolymer Sample | | |
|---|---|---|---|
| | 8A | 8B | 8C |
| Visc. @ 190° C., cP | 20000 | 16000 | 2200 |
| Softening Point (° C.) | 135 | 125 | 133 |
| Needle Pen. (dmm) | 22 | 17 | 20 |
| Wt. % Ethylene | 22 | 22 | 22 |
| Wt. % Propylene | 78 | 78 | 78 |

The adhesives were produced in accordance with the process described in Example 4. The adhesives were produced with various additives including Eastotac™ H-100W (Eastman Chemical), Regalite™ R1090 (Eastman Chemical), Kaydol mineral oil (Sonneborn), and Irganox® 1010 (BASF). TABLE 10, below, describes the composition and properties of these inventive adhesives, which are labeled as "IA." It should be noted that the compositional components recited in TABLE 10 are based on weight percentage.

The coatability, sprayability, and adhesive performance of the inventive adhesives were compared against adhesives containing a commercially-available styrenic block copolymer ("SBC") and a commercially-available olefin-based copolymer as shown in TABLE 10. The coating/spraying analysis was performed using an Acumeter and Nordson CF nozzle with different add-ons (2, 3, and 4 gsm) at 800, 600, and 400 ft/min (6 gsm at 350 ft/min for 3 samples) at two different temperatures (137° C. and 163° C.). The tested substrates were 1 mil polyethylene and a 15 gsm spun bound nonwoven. The sprayability was observed and marked as "good," "poor," or "no" (i.e., not sprayable) after observing the spraying of adhesive at the designated temperature. The Brookfield viscosity, softening point, needle penetration, and the peel strength of the produced adhesives were also measured as described above. The width of the adhesive samples tested for peel strength was 15 to 20 mm.

TABLE 10

| | | Adhesives | | | | | | | Com. SBC-Based | Com. Olefin-Based |
|---|---|---|---|---|---|---|---|---|---|---|
| | | IA1 | IA2 | IA3 | IA4 | IA5 | IA6 | IA7 | | |
| Composition of Adhesives | Sample 8A | 40 | 40 | 40 | 60 | | | | | |
| | Sample 8B | | | | | 40 | 60 | | | |
| | Sample 8C | | | | | | | 70 | | |
| | Eastotac™ H-100W | | | 48.5 | | | | | | |
| | Regalite™ R1090 | 48.5 | 48.8 | | 34.5 | 48.5 | 34.5 | 29 | | |
| | Mineral Oil | 10.5 | 10.5 | 10.5 | 4.5 | 10.5 | 4.5 | | | |
| | Irganox® 1010 | 1 | 1 | 1 | 1 | 1 | 1 | 1 | | |
| | Brookfield Visc. 190° C. (cps) | 1688 | 2133 | 2760 | 6425 | 1515 | 5300 | 913 | N/A | N/A |
| | Peel strength for 137° C. Samples (g) | N/A | 172 | 143 | 136 | 111 | 84 | 49 | N/A | N/A |

TABLE 10-continued

| | IA1 | IA2 | IA3 | IA4 | IA5 | IA6 | IA7 | Com. SBC-Based | Com. Olefin-Based |
|---|---|---|---|---|---|---|---|---|---|
| Peel strength for 163° C. Samples (g) | 130 | 136 | 122 | 116 | 117.7 | 60 | 50 | 101 | 137 |
| Sprayability at 137° C./163° C. | Good/Good | Good/Good | Good/Good | Good/Good | Good/Good | Good/Good | Good/Good | Poor/Good | No/Poor |
| Softening Point (° C.) | 120.4 | 113.3 | 115.9 | 125.2 | 106.7 | 114.8 | 123.7 | N/A | N/A |
| Needle Penetration (dmm) | 55 | 51 | 43 | 32 | 38 | 26 | 28 | N/A | N/A |

It should be noted that peel strength tests of 137° C. samples were inconclusive for the two comparative commercial adhesives due to the poor sprayability of these adhesives. As shown in TABLE 10, the inventive adhesives exhibited desirable coatability and sprayability at low and high temperatures, thereby indicating a broad operating window. Furthermore, the inventive adhesives exhibited adhesive properties that are either comparable or superior to standard adhesives in the industry.

Example 9

Hot melt adhesives for packaging applications were produced using the inventive propylene-ethylene copolymers depicted in TABLE 11. Furthermore, comparative adhesives were produced from a comparative propylene homopolymer ("CPH") as depicted in TABLE 11. The copolymers used to manufacture these adhesive samples were produced in accordance with the process described in Example 1. Furthermore, TABLE 11 also indicates the electron donor that was used to produce the copolymers (cyclohexylmethyldimethoxysilane ("C") or dicyclopentyldimethoxysilane ("D")).

TABLE 11

| | Copolymer Sample | | |
|---|---|---|---|
| | CPH | 9A | 9B |
| Visc. @ 190° C., cP | 1028 | 3165 | 2520 |
| Softening Point (° C.) | 135 | 132.1 | 137.5 |
| Needle Pen. (dmm) | 22 | 12 | 14 |
| Wt. % Ethylene | 0 | 9.9 | 16.7 |
| Wt. % Propylene | 100 | 90.1 | 83.3 |
| Electron Donor | C | C | D |

The adhesives were produced in accordance with the process described in Example 4. The adhesives were produced with various additives including Eastotac™ H-100W (Eastman Chemical), Eastotac™ H-130W (Eastman Chemical), Sasol wax H-1 (Sasol), and Irganox® 1010 (BASF). TABLE 12, below, describes the composition and properties of the inventive adhesives, which are labeled as "IA," and the comparative adhesives ("CA"). It should be noted that the compositional components recited in TABLE 12 are based on weight percentage. The initial viscosities of the adhesives were measured at 162° C. and 177° C., along with the SAFT, PAFT, and open/set times. The SAFT measurements were performed to understand the shear strength of the adhesives over a temperature period in a SAFT oven. Viscosity profiles of the adhesives were generated to determine the processability characteristics. Furthermore, the initial Gardner color before aging and adhesive clarity at 177° C. were also measured and observed.

TABLE 12

| | | Adhesives | | | | |
|---|---|---|---|---|---|---|
| | | CA1 | CA2 | IA1 | IA2 | IA3 |
| Composition of Adhesives | CPH | 39.8 | 59.8 | | | |
| | Sample 9A | | | 39.8 | 59.8 | |
| | Sample 9B | | | | | 39.8 |
| | Eastotac ™ H-100W | | | | | 39.8 |
| | Eastotac ™ H-130W | 39.8 | 19.8 | 39.8 | 19.8 | |
| | Sasol wax H-1 | 19.8 | 19.8 | 19.8 | 19.8 | 19.8 |
| | Irganox ® 1010 | 0.6 | 0.6 | 0.6 | 0.6 | 0.6 |
| | Brookfield Visc. 162° C. (cps) | 465 | 750 | 3250 | 9062 | 575 |
| | Brookfield Visc. 177° C. (cps) | 330 | 545 | 2192 | 6366 | 417 |
| | Open/Set time (s) | 20/10 | N/A | 15/10 | 15/10 | N/A |
| | PAFT (° C.) | 77.4 | 43.3 | 83.6 | 54.9 | 63 |
| | | (4.7) | (3.8) | (2.6) | (9) | (2) |
| | SAFT (° C.) | 108.6 | 199.6 | 120.3 | 136.5 | 101 |
| | | (5) | (2.5) | (0.4) | (0.4) | (2) |
| | Gardner Color (Initial) | 2 | 4 | 5 | 6 | 1 |
| | Adhesive Clarity (177° C.) | clear | clear | hazy | hazy | clear |

As shown in TABLE 12, the inventive adhesives exhibited adhesive properties that are either comparable or superior to adhesives produced from propylene. The inventive adhesives can exhibit desirable clarity and color, along with desirable processability as indicated by their viscosities.

Example 10

Hot melt adhesives for packaging applications were produced using the inventive propylene-ethylene copolymers depicted in TABLE 13. Furthermore, comparative adhesives were produced from Affinity™ GA1950 (Dow) and comparative polymers ("CP") as depicted in TABLE 13. The copolymers used to manufacture these adhesive samples were produced in accordance with the process described in Example 1. Furthermore, TABLE 13 also indicates the electron donor that was used to produce the copolymers.

TABLE 13

| | Copolymer Sample | | | | |
|---|---|---|---|---|---|
| | CP1 | CP2 | CP3 | 10A | 10B |
| Visc. @ 190° C., cP | 8350 | 8812 | 29950 | 7825 | 19975 |
| Softening Point (° C.) | 157.5 | 155.8 | 157.3 | 111.9 | 107.7 |
| Needle Pen. (dmm) | 7 | 9 | 1 | 29 | 37 |
| Wt. % Ethylene | 0 | 0 | 6.2 | 22.8 | 27.9 |
| Wt. % Propylene | 100 | 100 | 93.8 | 97.2 | 92.1 |
| Electron Donor | None | None | Anisole | D | D |

The adhesives were produced in accordance with the process described in Example 4. The adhesives were produced with various additives including Regalite™ R1090 (Eastman Chemical), Escorez® 5300 (Exxonmobil), Piccotac™ 1095 (Eastman Chemical), Piccotac™ 7590 (Eastman Chemical), Sasol wax H-1 (Sasol), and Irganox® 1010 (BASF). TABLE 14, below, describes the composition and properties of the inventive adhesives, which are labeled as "IA," and the comparative adhesives labeled as "CA." It should be noted that the compositional components recited in TABLE 14 are based on weight percentage and that all components add up to 100 percent; however, this does not include the 1 percent of antioxidant (Irganox® 1010), which was added after all other components were combined. The weight percentage for the antioxidant was based off the combined weight percentage of the other components.

The initial viscosities of the adhesives were measured at 150° C., 162° C., and 177° C., along with the SAFT, PAFT, and open/set times. Viscosity profiles of the adhesives were generated to determine the processability characteristics of the adhesives. The SAFT measurements are performed to understand the shear strength of the adhesives over a temperature period in a SAFT oven. Furthermore, the adhesive clarity at 177° C. was also observed.

As shown in TABLE 14, the inventive adhesives exhibited adhesive properties that are either comparable or superior to common adhesives in the industry. The inventive adhesives can exhibit desirable clarity and desirable processability as indicated by their viscosities. Furthermore, as shown in TABLE 14, the inventive adhesives can exhibit superior adhesive properties.

Example 11

Hot melt pressure-sensitive adhesives for tapes and labels were produced using an inventive propylene-ethylene copolymer (Sample 7D from Example 7). The adhesives were produced in accordance with the process described in Example 4. The adhesives were produced with Vistamaxx™ 6202 (Exxonmobil), Kraton® 1162 (Kraton), Kraton® 1657 (Kraton), Regalite™ R1090 (Eastman Chemical), Kaydol mineral oil (Sonneborn), and Irganox® 1010 (BASF). TABLE 15, below, describes the composition and properties of the inventive adhesives. It should be noted that the compositional components recited in TABLE 15 are based on weight percentage. The probe tack (kg) of the adhesive was measured according to ASTM D9279 and the hold power (hours) was measured according to ASTM D3654.

TABLE 15

| | | Adhesives | | |
|---|---|---|---|---|
| | | IA1 | IA2 | IA3 |
| Composition of Adhesives | Sample 7D | 20 | 20 | 20 |
| | Vistamax ® 6202 | 20 | | |
| | Kraton ® 1161 | | 20 | |
| | Kraton ® 1657 | | | 20 |

TABLE 14

| | | Adhesives | | | | | | | | | | | | | | | | |
|---|---|---|---|---|---|---|---|---|---|---|---|---|---|---|---|---|---|---|
| | | CA1 | CA2 | CA3 | CA4 | IA1 | IA2 | CA5 | CA6 | IA3 | CA7 | CA8 | IA4 | IA5 | CA9 | CA10 | IA6 | IA7 |
| Composition of Adhesives | Affinity GA1950 | 40 | | | | | | | | | | | | | | | | |
| | CP1 | | 40 | | | | | | | | | | | | | | | |
| | CP2 | | | 40 | | | | 40 | | | 40 | | | | 40 | | | |
| | CP3 | | | | 40 | | | | 40 | | | 40 | | | | 40 | | |
| | 10A | | | | | 40 | | | | 40 | | | 40 | | | | 40 | |
| | 10B | | | | | | 40 | | | | | | | 40 | | | | 40 |
| | Regalite ™ R1090 | 40 | 40 | 40 | 40 | 40 | 40 | | | | | | | | | | | |
| | Escorez ® 5300 | | | | | | | 40 | 40 | 40 | | | | | | | | |
| | Piccotac ™ 1095 | | | | | | | | | | 40 | 40 | 40 | 40 | | | | |
| | Piccotac ™ 7590 | | | | | | | | | | | | | | 40 | 40 | 40 | 40 |
| | Sasol wax | 20 | 20 | 20 | 20 | 20 | 20 | 20 | 20 | 20 | 20 | 20 | 20 | 20 | 20 | 20 | 20 | 20 |
| | Irganox ® 1010 | 1 | 1 | 1 | 1 | 1 | 1 | 1 | 1 | 1 | 1 | 1 | 1 | 1 | 1 | 1 | 1 | 1 |
| | Visc. 150° C. (cps) | 1867 | 7308 | 3685 | 30150 | 675 | 3360 | N/A | N/A | 4000 | N/A | 248300 | 3029 | 607 | 26550 | 87000 | 3604 | 752 |
| | Visc. 162° C. (cps) | 1300 | 810 | 940 | 3275 | 417 | 2490 | 1150 | 3080 | 2935 | 910 | 2895 | 1980 | 432 | 890 | 2820 | 2390 | 570 |
| | Visc. 177° C. (cps) | 932 | 607 | 670 | 1887 | 310 | 1320 | 860 | 2370 | 1872 | 685 | 2050 | 1692 | 317 | 815 | 1900 | 1507 | 427 |
| | Open/Set time (s) | 30/40 | 40/10 | — | — | — | — | — | — | — | — | — | — | — | — | — | — | — |
| | PAFT (° C.) | 60.6 | 72.9 | 75 | 75.1 | 67.3 | 50 | 71.5 | 73.4 | 62.5 | 76 | 76.2 | 71.2 | 49.4 | 79.3 | 79.3 | 70.6 | 47.7 |
| | SAFT (° C.) | 97.8 | 109.1 | 110 | 125.2 | 91.9 | 88.8 | 107.4 | 125.5 | 96 | 109.6 | 121.8 | 95.7 | 88.1 | 108.2 | 120.1 | 92 | 99.4 |
| | Clarity (177° C.) | Clear | Clear | Clear | Clear | Clear | Clear | Clear | Clear | Clear | Clear | Clear | Clear | Clear | Clear | Clear | Clear | Clear |

TABLE 15-continued

| | | Adhesives | | |
|---|---|---|---|---|
| | | IA1 | IA2 | IA3 |
| | Regalite ™ R1090 | 48.5 | 48.5 | 48.5 |
| | Mineral Oil | 10.5 | 10.5 | 10.5 |
| | Irganox ® 1010 | 1 | 1 | 1 |
| | Brookfield Visc. 177° C. (cps) | 14900 | 7200 | 10250 |
| | Probe Tack (kg) | 0.5 | 0.4 | 0.4 |
| | Hold Power (on SS) (hours) | 3.5 | .01 | 1.6 |

As shown in TABLE 15, the inventive adhesives exhibited adhesive properties that are either comparable or superior to common adhesives in the industry.

Example 12

Polymer blends were produced to observe the effects that certain polymers had on particular blends. In this example, a commercial propylene homopolymer (Exxon™ PP3155) was compared to a propylene homopolymer prepared in accordance with Example 1. This propylene homopolymer ("Sample 12A") was produced without an electron donor and had a softening point of 157.5° C. and a needle penetration of 7 dmm. These two homopolymers were separately combined with Kraton® G1650 (Kraton), Kraton® G1651 (Kraton), CaCO₃, Drakeol® 34 oil (Calumet Specialty Products), and Kristalex™ 5140 (Eastman Chemical) to produce polymer blends. The composition and properties of these polymer blends are depicted in TABLE 16 below. It should be noted that all composition values in TABLE 16 are based on weight percentages.

Furthermore, various properties of the polymer blends were measured as shown TABLE 16. The tested properties included Shore A hardness (ASTM D2240), melt flow rate (ASTM D1238), tear strength (ASTM D624), 100% modulus (ASTM D412), 200% modulus (ASTM D412), 300% modulus (ASTM D412), elongation at break (ASTM D412), tensile strength (ASTM D412), and Young's Modulus (ASTM E111-04).

TABLE 16

| | Blends | Non-Commercial | Commercial |
|---|---|---|---|
| Composition of Blends | Exxon ® 3155 (PP) | | 15 |
| | Sample 12A | 15 | |
| | Kraton ® G1650 | 17.5 | 17.5 |
| | Kraton ® G1651 | 17.5 | 17.5 |
| | CaCO₃ | 15 | 15 |
| | Drakeol ® 34 oil | 25 | 25 |
| | Kristalex ™ 5140 | 10 | 10 |
| | Hardness (Shore A) | 45 | 70 |
| | Melt Flow Rate (22° C./5.16 kg) | 31.74 | 18.1 |
| | Tear Strength (lbf/in) | 170 | 281 |
| | 100% Modulus | 209 | 466 |
| | 200% Modulus | 298 | 670 |
| | 300% Modulus | 415 | 932 |
| | Elongation at Break | 425 | 677 |

TABLE 16-continued

| Blends | Non-Commercial | Commercial |
|---|---|---|
| Tensile Strength | 576 | 2785 |
| Young's Modulus | 0.324 | 0.67 |

As shown above, the non-commercial homopolymer produced using the process described above can improve polymer blends in a similar manner as commercial homopolymers.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

Example 13

Hot melt adhesives for hygiene and packaging applications were produced using the inventive propylene-ethylene copolymers depicted in TABLE 17. The copolymers used to manufacture these adhesive samples were produced in accordance with the process described in Example 1. Furthermore, TABLE 17 also indicates the electron donor that was used to produce the copolymers.

TABLE 17

| | Copolymer Sample | | | | | |
|---|---|---|---|---|---|---|
| | 13A | 13B | 13C | 13D | 13E | 13F |
| Visc. @ 190° C., cP | 1813 | 2063 | 16525 | 18400 | 19000 | 1840 |
| Softening Point (° C.) | 133.5 | 130.6 | 110.4 | 115.9 | 117.4 | 132.7 |
| Needle Pen. (dmm) | 22.8 | 22.7 | 32.8 | 28.1 | 23.6 | 22.8 |
| Wt. % Ethylene Wt. % | 16 | 16 | 22 | 21 | 20 | 16 |
| Propylene | 84 | 84 | 78 | 79 | 80 | 84 |
| Electron Donor | D | D | D | D | D | D |

The adhesives were produced in accordance with the process described in Example 4. The adhesives were produced with various additives including Regalite™ R1090 (Eastman Chemical), Eastotac™ H100W (Eastman Chemical), Kaydol® mineral oil (Sonneborn), Licocene® wax (Clarient), Sasol wax H-1 (Sasol), and Irganox® 1010 (BASF). TABLE 18 and TABLE 19, below, describes the composition and properties of the inventive adhesives. TABLE 18 contains inventive adhesives that can be utilized for the hygiene construction market, while TABLE 19 contains inventive adhesives that can be used for packaging. It should be noted that the compositional components recited in TABLE 18 and TABLE 19 are based on weight percentage and that all components add up to 100 percent.

TABLE 18

| | IA1 | IA2 | IA3 | IA4 | IA5 | IA6 | IA7 | IA8 | IA9 | CA1 | CA2 | CA3 | CA4 |
|---|---|---|---|---|---|---|---|---|---|---|---|---|---|
| 13C | 40 | — | — | 35 | — | — | 35 | — | — | | | | |
| 13D | — | 40 | — | — | 35 | — | — | 35 | — | | | | |
| 13E | — | — | 40 | — | — | 35 | — | — | 35 | | | | |
| Regalite ® R1090 | 48.5 | 48.5 | 48.5 | 46.5 | 46.5 | 46.5 | 46.5 | 46.5 | 46.5 | | | | |
| Kaydol ® Oil | 10.5 | 10.5 | 10.5 | 10.5 | 10.5 | 10.5 | 10.5 | 10.5 | 10.5 | | | | |
| Sasol ® H1 wax | — | — | — | 7 | 7 | 7 | — | — | — | | | | |
| Licocene ® 6102 | — | — | — | — | — | — | 7 | 7 | 7 | | | | |
| Irganox ® 1010 | 1 | 1 | 1 | 1 | 1 | 1 | 1 | 1 | 1 | | | | |
| 300 mm Peel Strength—24 Hrs at Room Temperature (Signature Nozzle Sprayed Samples) | | | | | | | | | | | | | |
| g/mm | 2.64 | 3.17 | 2.63 | 4.62 | 4.51 | 5.1 | 4.64 | 4.03 | 4.86 | 1.73 | 4.64 | 4.62 | 3.44 |
| Std. Dev. | 0.2 | 0.43 | 0.19 | 0.2 | 0.42 | 0.28 | 0.33 | 0.29 | 0.36 | 0.17 | 0.19 | 0.37 | 0.23 |
| 300 mm Peel Strength—Body Temperature (Signature Nozzle Sprayed Samples) | | | | | | | | | | | | | |
| g/mm | 2.83 | 3.34 | 3.27 | 5.08 | 4.81 | 5.58 | 4.45 | 4.52 | 4.55 | 1.91 | 4.99 | 4.39 | 3.43 |
| Std. Dev. | 0.29 | 0.22 | 0.09 | 0.19 | 0.49 | 0.52 | 0.13 | 0.39 | 0.52 | 0.12 | 0.2 | 0.17 | 0.05 |
| 300 mm Peel Strength—2 Weeks Aged (Signature Nozzle Sprayed Samples) | | | | | | | | | | | | | |
| g/mm | 2.75 | 3.21 | 2.91 | 4.74 | 5.23 | 6.82 | 4.91 | 5.05 | 6.13 | 2.71 | 5.11 | 4.16 | 3.39 |
| Std. Dev. | 0.15 | 0.38 | 0.22 | 0.26 | 0.55 | 0.59 | 0.27 | 0.69 | 0.51 | 0.34 | 0.16 | 0.21 | 0.34 |
| Spray Temperature (° F.) | | | | 305 to 350 | | | | | | 305 | 350 | 325 | 335 |
| Brookfield Viscosity and Gardner Color | | | | | | | | | | | | | |
| Initial Viscosity at 177° C. (cPS) | 1600 | 1470 | 1657 | 925 | 660 | 992 | 1017 | 1145 | 1102 | 1780 | 3287 | 2250 | 1617 |
| 96 hrs at 177° C. Aged Viscosity (cPS) | 1390 | 1308 | 1507 | 857 | 2260 | 910 | 990 | 1050 | 975 | | 2245 | 987 | 240 |
| Initial Gardner Color) | 1 | 1 | 1 | 1 | 1 | 1 | 1 | 1 | 1 | 1 | 1 | 2 | 8 |
| 96 hrs at 177° C. Aged Gardner Color | 8 | 8 | 6 | 7 | 8 | 7 | 6 | 7 | 7 | 9 | 12 | 18 | 18 |
| 300 mm Peel Strength—24 Hrs at Room Temperature (CF Nozzle Sprayed Samples) | | | | | | | | | | | | | |
| g/mm | 5.58 | 5.99 | 6.24 | 8.36 | 8.33 | 10.28 | 9.49 | 9.06 | 9.94 | | | | |
| Std. Dev. | 0.36 | 0.39 | 0.68 | 0.24 | 0.71 | 0.51 | 0.43 | 0.93 | 0.61 | | | | |
| 300 mm Peel Strength—Body Temperature (CF Nozzle Sprayed Samples) | | | | | | | | | | | | | |
| g/mm | 5.75 | 6.2 | 6.58 | 8.94 | 9.24 | 10.11 | 8.92 | 9.79 | 9.44 | | | | |
| Std. Dev. | 0.32 | 0.15 | 0.49 | 0.44 | 0.51 | 0.38 | 0.36 | 0.77 | 0.49 | | | | |
| 300 mm Peel Strength—2 Wks Aged (CF Nozzle Sprayed Samples) | | | | | | | | | | | | | |
| g/mm | 5.88 | 6.76 | 6.26 | 10.31 | 10.39 | 14.32 | 12.06 | 11.69 | 11.49 | | | | |
| Std. Dev. | 0.25 | 0.36 | 0.35 | 0.85 | 1.44 | 0.75 | 0.88 | 0.61 | 0.42 | | | | |
| Spray Temperature (° F.) | | | | 270 to 350 | | | | | | | | | |

TABLE 18, above, describes the composition and properties of the inventive adhesives, which are labeled as IA1-IA9. Comparative commercial adhesives were also analyzed and are labeled as CA1-CA4. CA1-CA3 utilize olefin based polymers for adhesives in hygiene construction. CA4 is also a commercial adhesive using styrenic block copolymers for use in hygiene construction. The hygiene adhesives in TABLE 18 made using inventive polymers show broad operating window using wide range of spraying/coating techniques (signature, summit, CF, omega, intermittent, sloat etc.) with excellent sprayability/coatability characteristics over a wide range of temperatures (270° F. to 350° F.) with good adhesive peel at room temperature, body temperature and under aged conditions (elevated temperature and room temperature) with an add-on level varying from 0.5-8.0 gsm. Thermal stability, Garner color and Brookfield viscosity stability of the adhesives made using inventive polymers are also excellent, and the adhesives made using the inventive polymers are clear at room temperature with no color and no odor.

The initial viscosity of the adhesives in TABLE 19 was measured at 177° C., along with the SAFT, PAFT, % fiber tear and open/set times. Aged viscosities of the adhesives were generated to determine the processability characteristics and long term aging stability of the adhesives. The PAFT and SAFT measurements are performed to understand the peel adhesion and shear strength of the adhesives over a temperature period in a SAFT oven. Furthermore, the initial and aged color in Gardner color scale was also measured.

TABLE 19

|  | IA10 | IA11 | IA12 | IA13 | IA14 | IA15 | IA17 | IA18 | IA19 | IA20 |
|---|---|---|---|---|---|---|---|---|---|---|
| 13A | 60 | 75 |  |  |  |  | 60 | 75 |  |  |
| 13F |  |  | 60 | 75 | 60 | 75 |  |  | 60 | 75 |
| Regalite ® R1090 | 14.5 | 4.5 | 14.5 | 4.5 |  |  | 14.5 | 4.5 | 14.5 | 4.5 |
| Eastotac ® H100W |  |  |  |  | 14.5 | 4.5 |  |  |  |  |
| Licocene ® 6102 | 24.5 | 19.5 | 24.5 | 19.5 | 24.5 | 19.5 |  |  |  |  |
| Sasol H1 Wax |  |  |  |  |  |  | 24.5 | 19.5 | 24.5 | 19.5 |
| Irganox ® 1010 | 1 | 1 | 1 | 1 | 1 | 1 | 1 | 1 | 1 | 1 |
| Adhesive Properties | | | | | | | | | | |
| Initial Brookfield viscosity @ 177° C. | 742.5 | 1170 | 800 | 1165 | 790 | 2640 | 552 | 935 | 565 | 930 |
| Aged (96 hrs at 177° C.) Brookfield viscosity @ 177° C. | 715 | 1070 | 677 | 1035 | 715 | 2377 | 445 | 790 | 452 | 795 |
| Initial Gardner color | 1 | 1 | 1 | 1 | 1 | 1 | 1 | 1 | 1 | 1 |
| Aged Gardner color (96 hrs at 177° C.) | 8 | 8 | 8 | 8 | 10 | 7 | 8 | 7 | 8 | 6 |
| PAFT, Kraft paper (° C.) | 27.2 | 26.5 | 26.7 | 26.5 | 32.1 | 31 |  |  |  |  |
| PAFT Std. Deviation | 1.3 | 0.1 | 0.4 | 0.4 | 4.3 | 3.6 |  |  |  |  |
| SAFT, Kraft paper (° C.) | 123.3 | 70 | 108.7 | 127.3 | 118.5 | 110.8 |  |  |  |  |
| SAFT—Std. Deviation | 3.5 | 8.5 | 12.9 | 3.3 | 2.3 | 1.9 |  |  |  |  |
| Open/Set time (sec) | 40/18 | 32/12 | 35/13 | 32/15 | 32/9 | 45/17 | 20/25 | 20/27 | 15/20 |  |
| % Fiber Tear | | | | | | | | | | |
| 0° C. | 100 | 100 | 100 | 100 | 100 | 100 | 0 | 0 | 0 | 0 |
| (3x = 3 samples) | (3x) | (3x) | (3x) | (3x) | (3x) | (3x) | (3x) | (3x) | (3x) | (3x) |
| Room Temperature |  |  |  |  | 100 | 100 | 0 | 0 | 0 | 0 |
| (3x = 3 samples) |  |  |  |  | (3x) | (3x) | (3x) | (3x) | (3x) | (3x) |
| 135° C. | 0 | 0 | 0 | 0 | 25 | 0 | 0.5 | 0 | 0 | 0 |
| (3x = 3 samples) | (3x) | (3x) | (3x) | (3x) | (3x) | (3x) | (3x) | (3x) | (3x) | (3x) |

What is claimed is:

1. A copolymer comprising propylene and ethylene, wherein said copolymer has a softening point in the range of 90 to less than 115° C., wherein said copolymer has a needle penetration equal to or less than 53 dmm, wherein said copolymer comprises at least 14 weight percent of ethylene.

2. The copolymer of claim 1, wherein said copolymer comprises in the range of 14 to 35 weight percent of ethylene.

3. The copolymer of claim 1, wherein said copolymer has a Brookfield viscosity at 190° C. in the range of 500 to 30,000 cps.

4. The copolymer of claim 1, wherein said copolymer comprises in the range of 40 to 85 weight percent of propylene.

5. The copolymer of claim 1, wherein the weight ratio of propylene to ethylene in said copolymer is in the range of 1:1 to 15:1.

6. The copolymer of claim 1, wherein said copolymer comprises at least one $C_4$-$C_{10}$ alpha-olefin.

7. An article comprising said copolymer of claim 1.

8. An adhesive comprising said copolymer of claim 1.

9. The adhesive of claim 8, wherein said adhesive comprises in the range of 5 to 95 weight percent of said copolymer.

10. The adhesive of claim 8, wherein said adhesive comprises in the range of 5 to 95 weight percent of at least one polymer.

11. The adhesive of claim 8, wherein said adhesive comprises in the range of 0 to 70 weight percent of at least one tackifier.

12. The adhesive of claim 8, wherein said adhesive comprises in the range of 0 to 30 weight percent of at least one processing oil.

13. The adhesive of claim 8, wherein said adhesive comprises in the range of 0 to 30 weight percent of at least one wax.

14. The adhesive of claim 8, wherein said needle penetration is in the range of 0.5 to 50 dmm.

15. The adhesive of claim 8, wherein the weight ratio of propylene to ethylene in said copolymer is in the range of 1:1 to 15:1.

16. The adhesive of claim 8, wherein said adhesive has a peel strength in the range of 1 to 200 g/mm when applied at temperatures in the range of 100 to 145° C., wherein said adhesive has a peel strength in the range of 1 to 250 g/mm when applied at temperatures in the range of 145 to 180° C.

17. The adhesive of claim 8, wherein said adhesive has a loop tack in the range of 0.1 to 50 lbf.

18. The adhesive of claim 8, wherein said adhesive has an initial Gardner color of 0.1 to 18.

19. The copolymer of claim 1, wherein said copolymer comprises in the range of 17 to 40 weight percent of ethylene.

20. The copolymer of claim 1, wherein said copolymer comprises a weight ratio of propylene to ethylene of not more than 5:1.

* * * * *